US008125688B2

(12) United States Patent
Watanabe

(10) Patent No.: US 8,125,688 B2
(45) Date of Patent: Feb. 28, 2012

(54) PRINT DATA GENERATING APPARATUS, PRINTING APPARATUS, METHOD TO GENERATE PRINT DATA, AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 512 days.

(21) Appl. No.: 12/320,184

(22) Filed: Jan. 21, 2009

(65) Prior Publication Data

US 2009/0237684 A1 Sep. 24, 2009

(30) Foreign Application Priority Data

Mar. 20, 2008 (JP) ................................ 2008-072618

(51) Int. Cl.
*H04N 1/60* (2006.01)
(52) U.S. Cl. ..................... 358/1.9; 358/515; 358/3.29
(58) Field of Classification Search ................ 358/1.9, 358/3.29, 515; 347/15, 19
See application file for complete search history.

(56) References Cited

U.S. PATENT DOCUMENTS

| | | | |
|---|---|---|---|
| 7,040,232 B2* | 5/2006 | Van Holten et al. | 358/1.15 |
| 7,419,257 B2* | 9/2008 | Mouri et al. | 347/103 |
| 7,717,532 B2* | 5/2010 | Kroon et al. | 347/15 |
| 7,920,297 B2* | 4/2011 | Doggett et al. | 358/3.29 |
| 2004/0027416 A1 | 2/2004 | Rosenberger et al. | |
| 2005/0200679 A1 | 9/2005 | Falser et al. | |
| 2005/0206927 A1* | 9/2005 | Yamada | 358/1.9 |
| 2005/0270351 A1* | 12/2005 | Mouri et al. | 347/103 |
| 2006/0250427 A1* | 11/2006 | Kroon et al. | 347/9 |
| 2007/0091138 A1* | 4/2007 | Hersch et al. | 347/19 |
| 2009/0033961 A1* | 2/2009 | Tamagawa | 358/1.9 |
| 2009/0207458 A1* | 8/2009 | Doggett et al. | 358/3.29 |
| 2010/0060682 A1* | 3/2010 | Akatsuka | 347/9 |
| 2010/0177327 A1* | 7/2010 | Maheshwari | 358/1.9 |
| 2011/0057976 A1* | 3/2011 | Hatanaka et al. | 347/15 |

FOREIGN PATENT DOCUMENTS

| | | |
|---|---|---|
| EP | 1 835 725 A1 | 9/2007 |
| JP | A-10-233932 | 9/1998 |
| JP | A-2002-046303 | 2/2002 |
| JP | A-2005-103762 | 4/2005 |
| JP | A-2010-519603 | 6/2010 |
| WO | WO 2007/099554 A2 | 9/2007 |

OTHER PUBLICATIONS

Search Report issued in European Patent Application No. 09154520. 2, on Jun. 18, 2010.
Reasons for Rejection dated Oct. 11, 2011 issued in Japanese Patent Application No. 2008-072618 (With Translation).

* cited by examiner

*Primary Examiner* — Kimberly A Williams
(74) *Attorney, Agent, or Firm* — Oliff & Berridge, PLC

(57) ABSTRACT

A print data generating apparatus to generate print data, which is to be used in a printing apparatus to form an image in a plurality of colorants, based on originally inputted image data representing the image, is provided. The print data generating apparatus includes a black enabled image data converter unit to convert the inputted image data into black enabled image data, which indicates scale values of a plurality of colors including a black color to be used in the image, a white scale value calculator unit to obtain scale values of a white color to be used in the image to be formed. The white scale value calculator unit calculates the scale values of the white color by inverting the scale values of the black color obtained in the conversion by the black enabled image data converter unit.

23 Claims, 14 Drawing Sheets

| | WHITE INK | BLACK INK | PREFERABLE COLOR OF RECORDING MEDIUM |
|---|---|---|---|
| CMY PRINT DATA | NO INK EJECTED (W=0) | CMY INKS BLENDED | WHITE |
| CMYW PRINT DATA | INVERTED K SCALE VALUES (W=255-K) | CMY INKS BLENDED | OTHER THAN BLACK OR WHITE |
| BLACK BASE USABLE PRINT DATA | INVERTED K SCALE VALUES (W=255-K) | BLACK COLOR OF RECORDING MEDIUM | BLACK |

161

| CMYK CONVERSION TABLE | | | | | | |
|---|---|---|---|---|---|---|
| sRGB SCALE VALUE | | | CMYK SCALE VALUE | | | |
| R | G | R | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

FIG. 7

PRINT DATA GENERATING APPARATUS, PRINTING APPARATUS, METHOD TO GENERATE PRINT DATA, AND COMPUTER USABLE MEDIUM THEREFOR

CROSS REFERENCE TO RELATED APPLICATION

This application claims priority from Japanese Patent Application No. 2008-072618, filed on Mar. 20, 2008, the entire subject matter of which is incorporated herein by reference.

BACKGROUND

1. Technical Field

Aspects of the present invention relate to a print data generating apparatus, a printing apparatus, a method to generate print data, and a computer usable medium therefor, and more specifically, to an apparatus, a method, and a computer usable medium to generate print data which is suitable for printing an image in a plurality of inks including white ink.

2. Related Art

Conventionally, an inkjet printing apparatus, which ejects a plurality of colors of inks and white opaque ink onto a recording medium, has been known. In the inkjet printing apparatus, the inks are drawn from ink reservoirs to a plurality of ejecting channels provided in an inkjet head and ejected from nozzles at the end of the ejecting channels when actuators such as heater elements and piezoelectric elements are selectively activated. When an image is formed in colors, each of pixels composing the image is resolved, for example, into the three primary colors, which are cyan (C), magenta (M), and yellow (Y), thereafter, a colored pixel is formed as the inks adjusted in their densities are ejected onto the recording medium. In addition, a pixel in black is reproduced by blending the colored inks or using black (K) ink. Further, white (W) opaque ink can be used to reproduce white pixels and to form a base layer on a dark-colored (i.e., black) recording medium so that pixels in the three primary colors can be reproduced clearly over the base layer regardless of a color of the recording medium. Thus, images reproduced in higher quality can be obtained without being limited by colors and lightness of the recording media.

For the inkjet printer capable of printing in white, various methods to eliminate an effect of a color of the recording medium, which is substantially a background color of the printed image, have been suggested. For example, according to a method disclosed in Japanese Patent Provisional Publication No. 2002-46303, an image represented in RGB color format is logically inversed, and the white base layer is formed according to the inversed image data. Thereafter, the original image is formed on the base layer, i.e., the inversed image. For another example, in a method disclosed in Japanese Patent Provisional Publication No. 2005-103762, the image data is converted into grayscale data prior to a printing operation, and discharge printing is performed on the recording medium based on the inverted image.

SUMMARY

In the conventional methods, an amount of the white ink and a degree of discharging in discharge printing are determined based on brightness of the image being inverted; however, the inverted brightness in the converted data and a preferable amount of the white ink to be ejected do not necessarily correspond with each other. Therefore, the suitable amount of the white ink to be ejected cannot be obtained from the inverted brightness, and it has been difficult to obtain a colored image in desirable quality especially when a color of the recording media is a dark color such as black. Although a method to evenly form a base layer in white on a black recording medium prior to forming a colored image has been suggested, the method requires a large amount of white ink for the base layer. Thus, a printing method, in which the color of the recording medium is utilized to reduce the usage amount of ink while quality of the printed image is maintained, has not been achieved.

In view of the above drawbacks, the present invention is advantageous in that a print data generating apparatus, a printing apparatus, a method to generate print data, and a computer usable medium therefor, by which the color of the recording medium is utilized to reduce the usage amount of ink while quality of the printed image is maintained, are provided.

According to an aspect of the invention, a print data generating apparatus to generate print data, which is to be used in a printing apparatus to form an image in a plurality of colorants, based on originally inputted image data representing the image, is provided. The print data generating apparatus included a black enabled image data converter unit to convert the inputted image data into black enabled image data, which indicates scale values of a plurality of colors including a black color to be used in the image, a white scale value calculator unit to obtain scale values of a white color to be used in the image to be formed. The white scale value calculator unit calculates the scale values of the white color by inverting the scale values of the black color obtained in the conversion by the black enabled image data converter unit.

According to another aspect of the invention, a printing apparatus capable of forming an image in a plurality of colorants including at least cyan colorant, magenta colorant, yellow colorant, and white colorant according to print data is provided. The print data is generated in a method which comprises steps of converting originally inputted image data into CMYK image data, which indicates scale values of a plurality of colors including a black color to be used in the image and calculating to obtain scale values of the white colorant to be used to form the image. In the step of calculating, the scale values of the white colorant is obtained by inverting scale values of the black color obtained in the step of converting.

According to still another aspect of the invention, a method to generate print data to be used in a printing apparatus to form an image, based on originally inputted image data representing the image, is provided. The method includes steps of converting originally inputted image data into CMYK image data, which indicates scale values of a plurality of colors including a black color to be used in the image and calculating to obtain scale values of the white colorant to be used to form the image. In the step of calculating, the scale values of the white colorant is obtained by inverting scale values of the black color obtained in the step of converting.

According to still another aspect of the invention, a computer usable medium including computer readable instructions to control a computer to generate print data, which is to be used in a printing apparatus to form an image, based on originally inputted image data representing the image, is provided. The computer readable instructions control the computer by executing steps of converting originally inputted image data into CMYK image data, which indicates scale values of a plurality of colors including a black color to be used in the image and calculating to obtain scale values of the white colorant to be used to form the image. In the step of calculating, the scale values of the white colorant is obtained by inverting scale values of the black color obtained in the step of converting.

BRIEF DESCRIPTION OF THE ACCOMPANYING DRAWINGS

FIG. 7 illustrates a data configuration of a color conversion table according to the first embodiment of the present invention.

DETAILED DESCRIPTION

Hereinafter, embodiments according to aspects of the present invention will be described with reference to the accompanying drawings.

Figure 1:
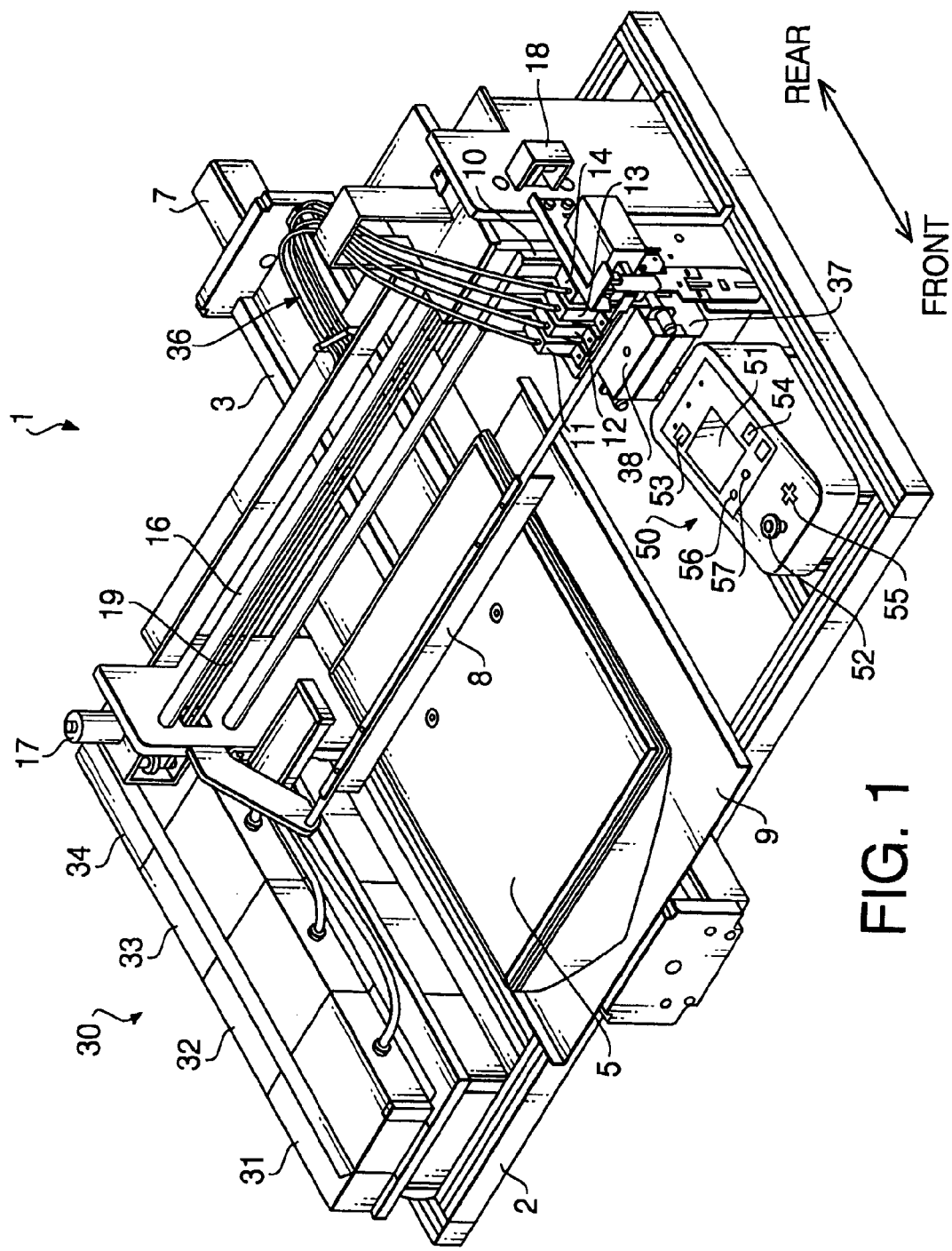
FIG. 1 is a perspective view of an inkjet printer according to a first embodiment of the present invention.

An inkjet printer 1 according to an embodiment of the present invention will be described with reference to FIG. 1. The inkjet printer 1 is a printing apparatus, which is capable of printing an image on a piece of fabric. FIG. 1 is a perspective view of the inkjet printer 1 according to the first embodiment of the present invention.

The inkjet printer 1 is provided with a carriage 10, on which four inkjet heads 11-14 are mounted. Further, the inkjet printer 1 includes a flat base plate 2 at a bottom. The base plate 2 has longer sides which extend in a right-and-left (horizontal) direction in FIG. 1, and a rail 4 is aligned in parallel with a front-rear direction, as indicated by an arrow, at an approximate center of the base plate 2. The rail 4 supports a platen 5, which is interchangeable and movable in the front-rear direction (i.e., an auxiliary direction) along the rail 4.

The platen 5 is a substantially flat plate having a front side moderately protrude toward the front side in FIG. 1 and detachably attached to the platen mount with longer sides thereof aligned in parallel with the front-rear direction of the base plate 2, and a recording medium, e.g., closing fabric, is placed substantially horizontally on the platen 5.

A tray 9 is provided below the platen 5 so that a remaining part of the fabric other than the area to be printed such as sleeves of the T-shirt is received thereby and prevented from hanging over the bottom surface of the chassis 2 when the clothing fabric as the recording medium, e.g., a T-shirt, is set on the platen 5. The tray 9 is fixed to the platen mount and has a bottom surface being substantially parallel with the top surface of the platen 5. The tray 9 is substantially larger than the platen 5 in a plan view.

The platen 5 is carried along the rail 4 by a platen drive motor 7 being a stepping motor, which is provided at a rear end portion of the rail 4. As a drive shaft of the platen drive motor 7 and a pulley (not shown) provided in vicinity of front end of the rail 4 are bound with a drive belt (not shown), the platen 5 fixed to the drive belt is reciprocated along the rail 4 by drive force generated by the platen drive motor 7.

At an approximately center but a relatively rear (i.e., closer to an upper side in FIG. 1) of the base plate 2, above the platen 5, a guide rail 16 to guide a carriage 10 with four inkjet heads 11-14 mounted thereon is provided. In the vicinity of a left-hand end of the guide rail 16, a carriage motor 17 to drive the carriage 10 is provided, while a pulley 18 is provided in the vicinity of a right-hand end of the first guide rail 16. Further, a carriage belt 19 is drawn between the carriage motor 17 and the pulley 18 under the guide rail 16. The carriage belt 19 is fixed to the carriage 10 so that the carriage 10 is reciprocated along the guide rail 16 in the right-and-left direction (i.e., a main scanning direction) when the carriage motor 17 is activated. The carriage motor 17 is a DC motor, by which a position of the first carriage 10 on the guide rail 16 is detectable based on output signals from a linear encoder (not shown) provided to the guide rail 16.

On the right-hand end of the inkjet printer 1, an ink cartridge storage 30, in which four ink cartridges 31-34 having inks therein are detachably attached, is provided. Each of the ink cartridges 31-34 is connected to each of inkjet heads 11-14 by flexible ink supplying tubes 36 so that the inks stored in the ink cartridges 31-34 are supplied to each channel of the inkjet heads 11-14. According to the present embodiment, the inkjet heads 11-14 are provided to eject cyan (C) transparent ink, magenta (M) transparent ink, yellow (Y) transparent ink, and white (W) opaque ink respectively therefrom, and the ink cartridges 31-34 respectively contain the cyan, magenta, and yellow transparent inks, and white opaque ink.

Each of the inkjet heads 11-14 in the carriage 10 is provided with a plurality of (for example, 128) ejection channels (not shown) through which the ink is conveyed. Each of the channels is provided with a piezoelectric actuator (not shown), which is activated individually, to eject an ink drop downward onto the recording medium from ejection nozzles (not shown) that are open at a nozzle surface of each of the inkjet heads 11-14. Further, at the right-hand end of the reciprocative range of each of the carriage 10, a maintenance mechanism (not shown) such as a capping unit and a purge unit for the inkjet heads 11-14 is provided.

At a position toward the front from the guide rail 16, a clearance sensor 8, which extends in a direction substantially perpendicular to the front-rear direction, is provided. The clearance sensor 8 scans the surface of the fabric and detects an obstacle such as dust and a crease formed on the fabric set on the platen 5 when the platen 5 is carried along the rail 4 from a position at the downstream side to the upstream side of the rail 4 as the printing operation starts.

At right-hand front of the inkjet printer 1 is provided an operation panel 50 to which a user inputs an instruction for the inkjet printer 1. The operation panel 50 includes a display 51, a print start button 52, a print cancel button 53, and a platen feed button 54, a direction key 55, an error indicator 56, and a data reception indicator 57. The display 51 is to display various information concerning, for example, operations in the inkjet printer 1. The print start button 52 is a button to be operated when a print operation is started. The cancel button 53 is a button to be operated when the print operation is ceased. When the platen feed button 54 is operated, the platen 5 is moved to a position wherein the fabric such as a T-shirt as the recording medium can be set on and removed from the platen 5. The direction key 55 is operated when, for example, the user selects an option concerning operations to be executed. The error indicator is a lamp to be lit when an error occurs in the inkjet printer 1. The data reception indicator 57 is a lamp to be lit when print data is received in the inkjet printer 1.

Figure 2:
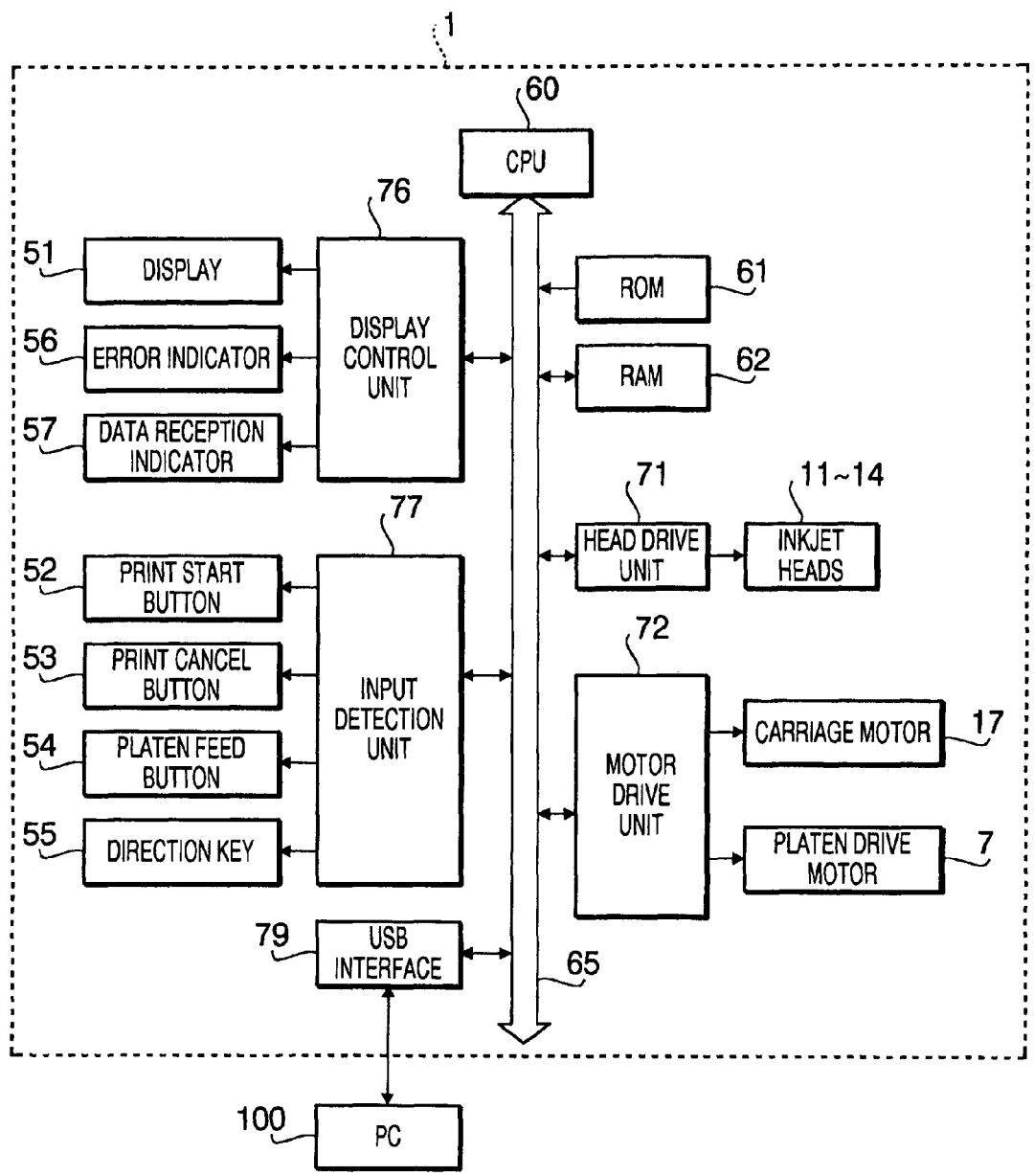
FIG. 2 is a block diagram to illustrate an electrical configuration of the inkjet printer according to the first embodiment of the present invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 60 that controls the entire operation in the inkjet printer 1. The CPU 60 is connected with a ROM 61, a RAM 62, a head drive unit 71, a motor drive unit 72, a display control unit 76, an input detection unit 77, and a USB interface 79. These components are connected to one another through a bus 65.

The ROM 61 includes a program storage area, wherein control programs to be executed by the CPU 60 to control operations of the inkjet printer 1 and printing programs to be executed for the printing operations are stored, and a program-related information storage area, wherein various information such as parameter settings, initial values, and data to be used in the programs are stored. Further, the ROM 61 may include various storage areas.

The RAM 62 in the inkjet printer 1 is provided with several areas including a received print data storing area for storing the print data transmitted from a PC 100, an in-printing data storing area for storing the print data being printed, and various information storing areas for storing various setting information.

The head drive unit 71 is connected to each of the inkjet heads 11-14 and activates the piezoelectric actuators being provided to each channel of the inkjet heads 11-14.

The motor drive unit 72 is connected to the carriage motor 17 and a platen drive motor 7, which drives a platen roller (not shown) to adjust timing and speed to feed the platen 5 holding the fabric as a recording medium. Thus, the carriage motor 17 and the platen drive motor 7 are controlled by the motor drive unit 72.

The display control unit 76 executes displaying processes of the display 51, the error indicator 56, and the data reception indicator 57, which are connected to the CPU 60 through the bus 65. The input detection unit 77 detects inputs through the print start button 52, the print cancel button 53, the platen feed button 54, and the direction key 55, which are connected to the CPU 60 through the bus 65. The USB interface 79 which allows communication between the inkjet printer 1 and external devices including the PC 100 through a USB cable (not shown).

With the aforementioned configuration of the inkjet printer 1 according to the embodiment, when the print data transmitted from the PC 100 is received in the inkjet printer 1, the user sets a piece of fabric on the platen 5 and presses the print button 52. Accordingly, the platen 5 with the fabric is moved to rearward of the inkjet printer 1 along the rail 4 by the platen drive motor 7 so that the position of the first carriage 10 with respect to the platen 5 corresponds to a recording start position. Thereafter, the inkjet heads 11-14 eject the inks as the first carriage 10 is moved from the right-hand side to the left-hand side in the inkjet printer 1 according to a recording instruction so that recording of one line is executed. Further, the platen 5 is moved to frontward from the rearward in the inkjet printer 1 for an amount corresponding to one line, and the inkjet heads 11-14 eject the inks as the first carriage 10 is moved from the right-hand side to the left-hand side in the inkjet printer 1 according to the recording instruction so that recording of the next line is executed. Subsequently, the platen 5 is moved to frontward from the rearward in the inkjet printer 1 for the amount corresponding to another one line portion. By repeating this operation, printing in inks is executed. At the end of the printing operation, the platen 5 is fed forth to a position wherein the fabric can be removed, thus the user removes the fabric which underwent the printing operation. The print data in the present embodiment is configured to represent a color of each pixel in the image in a binarized CMYW format (i.e., indication as to whether each of the CMYW inks is ejected or not ejected). In the inkjet printer 1, the white ink among the other CMY inks is firstly ejected from the inkjet heads 11. Optionally, the white ink may be ejected for a plurality of times on same pixels to form layers in order to assure whiteness. In such a case, the carriage 10 is reciprocated over a same line for a plurality of times to eject the white ink on the same pixels prior to ejecting the other colored inks according to the W data in the print data repeatedly used for the same line.

Figure 3:
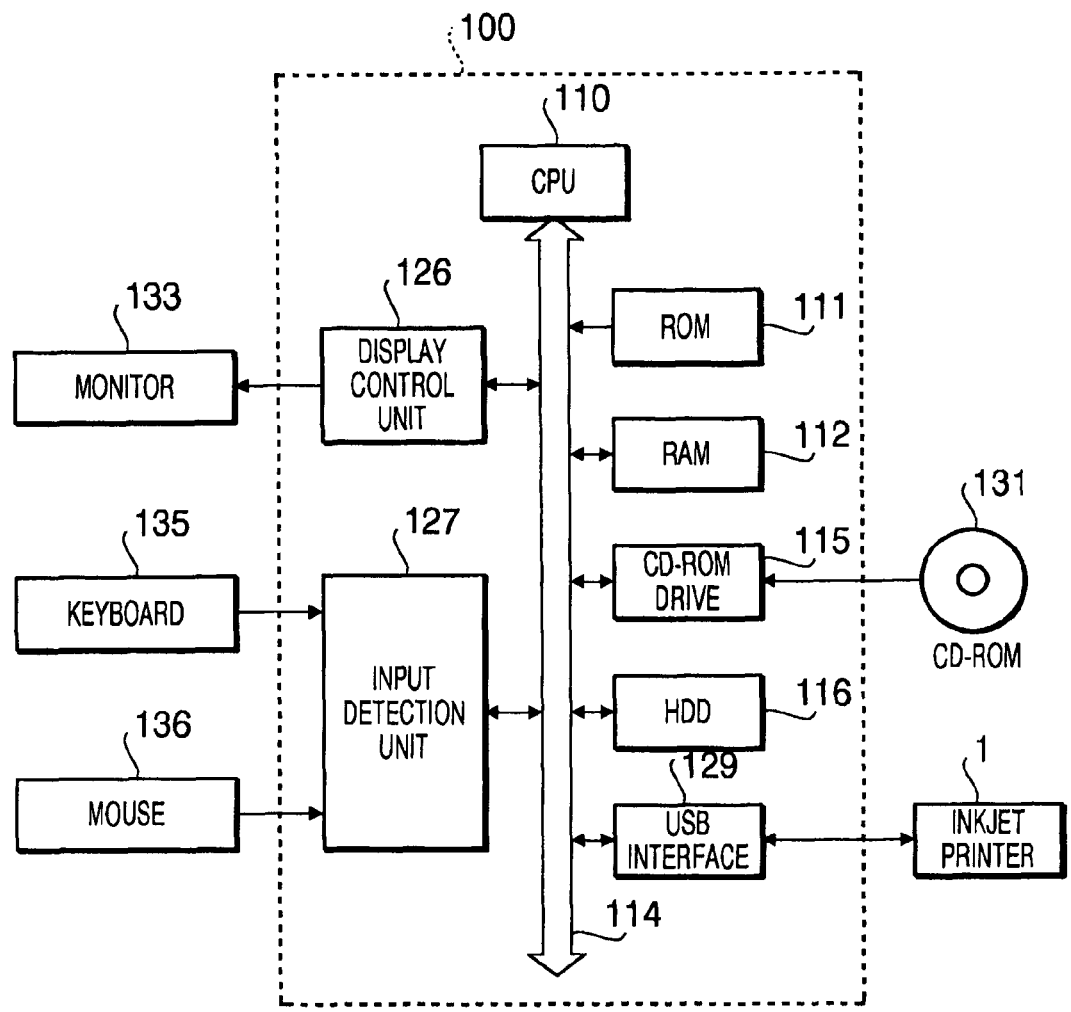
FIG. 3 is a block diagram to illustrate an electrical configuration of a PC (personal computer) according to the first embodiment of the present invention.
Figure 4:
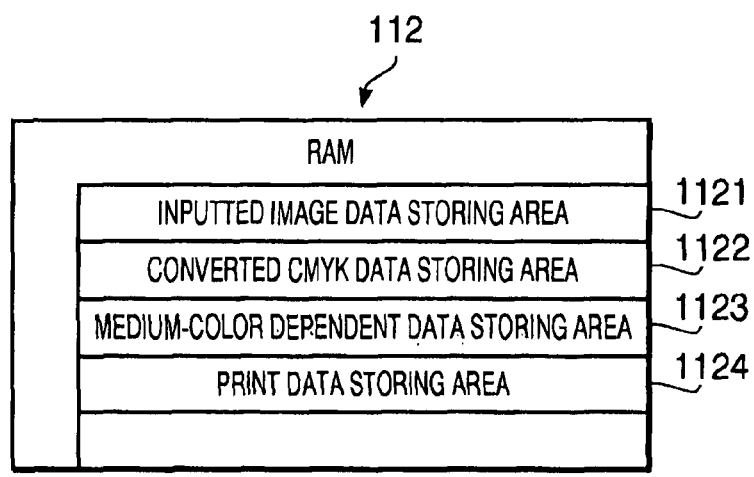
FIG. 4 is a schematic diagram of a RAM (random access memory) in the PC according to the first embodiment of the invention.
Figures 5, 6:
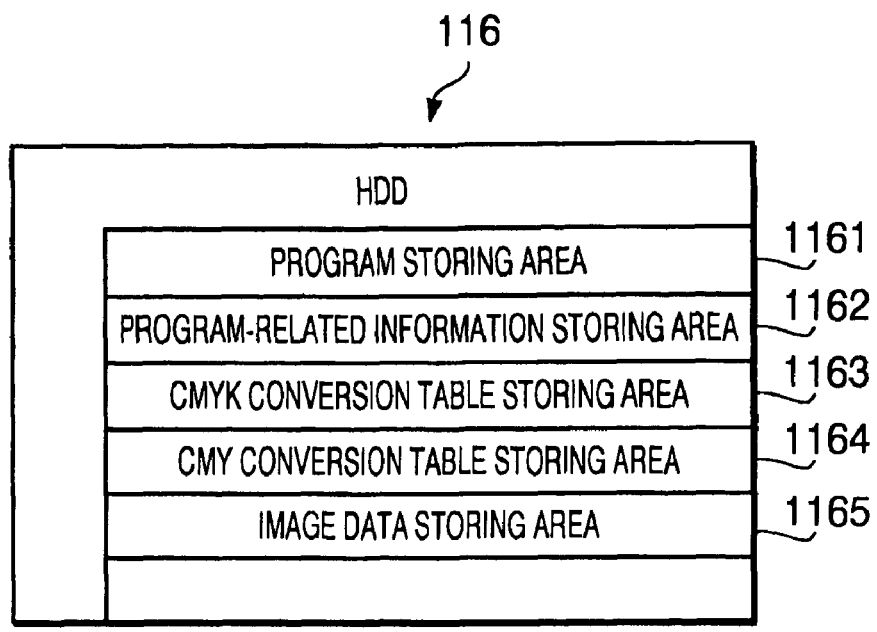
FIG. 5 is a schematic diagram of an HDD (hard disk drive) in the PC according to the first embodiment of the invention.
FIG. 6 is a chart to illustrate kinds and characteristics of print data generated in the PC according to the first embodiment of the present invention.

Next, a configuration of the PC 100 will be described with reference to FIGS. 3-5. FIG. 3 is a block diagram of an electrical configuration of the PC 100 according to the present embodiment of the invention. FIG. 4 is a schematic diagram of a RAM 112 in the PC 100 according to the present embodiment of the invention. FIG. 5 is a schematic diagram of an HDD 116 in the PC 100 according to the present embodiment of the invention. The PC 100 is connected to the inkjet printer 1 through a standardized communication cable, which is for example a USB. In the PC 100, print data is generated based on image data created by the user using various applications, and the print data is transmitted to the inkjet printer 1.

As shown in FIG. 3, the PC 100 is provided with a CPU 110 which controls the entire operation in the PC 100. The CPU 110 is connected with a ROM 111, a RAM 112, a CD-ROM drive 115, an HDD 116, a display control unit 126, an input detection unit 127, and a USB interface 129. These components are connected to one another through a bus 114.

The ROM 111 stores various information to be used in controlling programs, such as BIOS, to be executed by the CPU 110. The CD-ROM drive 115 is for reading data from a CD-ROM 131 inserted therein as a storage medium of data. The CD-ROM 113 stores data including a printer driver, which is a program to create the print data, and various settings, tables, and data to be used in the program. The data in the CD-ROM 113 is read by the CD-ROM drive 115 and stored in predetermined areas (see FIG. 5) in the HDD 116.

The display control unit 126 controls displaying processes to display information concerning an operation on a screen of a monitor 133. The input detection unit 127 is connected to input devices including a keyboard 135 and a mouse 136, which are operated by the user, and operations by the user to the input devices are detected by the input detection unit 127. The USB interface 129 allows communication between the PC 100 and external devices including the inkjet printer 1 through a USB cable (not shown).

As shown in FIG. 4, the RAM 112 is provided with several storage areas including an inputted image data storing area 1121, a converted CMYK data storing area 1122, a medium-color dependent data storing area 1123, and a print data storing area 1124. The inputted image data storing area 1121 is a storage area for temporarily storing originally inputted image data in sRGB format. The print data for printing an image is created based on the image data being stored in the inputted image data. The converted CMYK data storing area 1122 is a storage area for storing converted CMYK data, which is converted from the inputted image data into CMYK format. The converted CMYK data can be used when W data indicating scale values of white is created. The medium-color dependent data storing area 1123 is a storage area for storing medium-color dependent data in 256-scale values, which is used to create the print data. The medium-color dependent data is optimized data for a color of the recording medium to be used in the inkjet printer 1. The print data storing area 1124 is a storage area for storing binarized print data, which is created based on the medium-color dependent data in the medium-color dependent data storing area 1123.

As shown in FIG. 5, the HDD 116 contains several storage areas including a program storing area 1161, a program-related information storing area 1162, a CMYK conversion table storing area 1163, a CMY conversion table storing area 1164, an image data storing area 1165. The program storing area 1161 is a storage area for storing various programs to be executed in the PC 100 including the printer driver. The program-related information storing area 1162 is a storage area for storing information concerning settings, initial values, and data necessary for executing the programs. The CMYK conversion table storing area 1163 is a storage area for storing a CMYK conversion table (see FIG. 7). The CMYK conversion table defines correspondence between color information of the inputted image data, which is represented in sRGB (red, green, blue) format, and a colored ink level, which is represented in a CMYK format. The CMYK conversion table is thus used for converting the inputted image data into a colored ink level in CMYK format. The image data storing area 1165 is a storage area for storing a plurality of pieces of image data.

Hereinafter, with reference to FIGS. 6 and 7, kinds and transition of the data which can be generated in the PC 100 according to the present embodiment will be described. FIG. 6 is a chart to illustrate kinds and characteristics of the print data to be generated in the PC 100 according to the first embodiment of the present invention. FIG. 7 illustrates a data configuration of a CMYK conversion table 161 according to the first embodiment of the present invention.

As shown in FIG. 6, the print data to be generated in the PC 100 according to the present embodiment can be classified into three kinds, which are CMY print data, CMYW print data, and black base usable print data.

The CMY print data is data to be used in the inkjet printer 1 for printing a colored image in three colored inks, which are cyan (C) ink, magenta (M) ink, and yellow (Y) ink. The CMY print data is preferable for printing the image on a recording medium of which color is white. When an area in the image is to be reproduced in white, inks, including white ink, are not ejected on pixels in the area so that the base color of the recording medium can be effectively utilized to visualize the white color. Therefore, the white ink can be effectively saved for the area. Further, an area in the image to be reproduced in black can be formed by ejecting the three CMY colored inks to be blended on same pixels in the area. Therefore, even the inkjet printer 1, which is not equipped with black (K) ink, can reproduce black and the other colors.

The CMYW print data is data to be used in the inkjet printer 1 for printing a colored image in the colored (C, M, Y) inks, and the white (W) ink. The W-scale values in the CMYW print data are obtained by inverting K-scale values in the converted CMYK data, which are converted based on the CMYK conversion table 161. "Inverting" in the present embodiment refers to converting scale values into their complements. The K-values in the present embodiment are represented in 256 scales; therefore, a W-value is calculated by an equation $W=255-K$. When the inverted K-values are used as the W-scale values, rather than W-scale values conventionally obtained based on inversion of the brightness levels of the entire image data, a more preferable amount of white ink can be ejected. Accordingly, a preferable amount of white ink can be ejected to form a white base layer, on which a colored image in the colored inks is formed. Thus, the image in a desirable quality can be reproduced regardless of the color of the recording medium. Further, an area to be reproduced in black can be painted in the three CMY inks blended on the recording medium to reproduce the black. Thus, even the inkjet printer 1 which is not equipped with black ink can reproduce substantially all colors including black.

According to the CMYW print data, the white ink is ejected to form a pixel representing white. Meanwhile, in order to form a colored pixel, a preferable amount of white ink is ejected to form a base layer. Further, in order to form a pixel to be reproduced in white, the three CMY colored inks are ejected. Therefore, it is preferable that the CMYW print data is preferable to print an image on a recording medium of which color is any color other than white, and black base usable print data, which will be described later in detail, is preferable to print an image on a recording medium of which color is black. In consideration of the above, it is preferable that the color of the recording medium to be used in the inkjet printer 1 in the present embodiment to print the CMYW print data is any color other than white or black.

The black base usable print data, similarly to the CMYW print data, is print data to be used in the inkjet printer 1 for printing a colored image in the three (C, M, Y) colored inks and the white (W) ink. However, unlike the CMYW print data, an area to be painted in black is not reproduced by blending the three CMY inks. Rather, no ink is ejected on pixels in the area so that the base color of the recording medium is utilized to reproduce black. Therefore, it is preferable that the color of the recording medium to be used in the inkjet printer 1 in the present embodiment to print the black base usable print data is black. Meanwhile, in the black base usable print data, the W-scale values are obtained by inverting K-scale values in the converted CMYK data. Therefore, according to the black base usable print data, a preferable amount of white ink can be ejected to form pixels which represent colors with higher brightness levels such as white. For pixels to be represented in colors with lower brightness levels such as black, the color of the recording medium (e.g., black) can be effectively utilized, and the black ink which is otherwise ejected on the recording medium to form the black pixels can be effectively saved.

Next, transition of data in the PC 100 to generate the print data will be described. The print data is generated based on the inputted image data stored in the inputted image data storing area 1121 in the RAM 112. The image data is the data specified to be printed by the user among a plurality of pieces of image data which have been created by the user using various applications such as an application designed for editing graphics. Thus, the image data is saved in the image data storing area 1165 of the HDD 116. Specifically, the image data according to the present embodiment is represented in 256 color scale of the image data in sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

Thereafter, medium-color dependent data, which is represented in 256-scale values, is created based on the inputted image data in the sRGB format and according to the user's input. The created medium-color dependent data is stored in the medium-color dependent data storing area 1123 in the RAM 112. When the medium-color dependent data is created, one of the tables to convert inputted image data in the sRGB format into the CMYK format or into the CMY format is referred to. The above described three kinds of print data (i.e., the CMY print data, the CMYW print data, and the black base usable print data) is created based on the medium-color dependent data stored in the medium-color dependent data storing area 1123.

FIG. 7 illustrates a data configuration of the color conversion table 161 according to the first embodiment of the present invention. The color conversion table 161 is a table for converting the input data in 256 color scale in the sRGB format into the output data in 256 color scale in the CMYK format. As shown in FIG. 7, each of the CMYK scale values is defined to correspond to the sRGB scale value respectively. The CMYK format is a format to represent colors by using four colors, which are the three primary colors (cyan, magenta, and yellow) and black, and the color is reproduced by a combination of the four values that are C-value, M-value, Y-value, and K-value. The CMYK conversion table 161 is created by a known method and preliminarily stored in the CMYK conversion table storing area 1163 of the HDD 116. The sRGB scale values of each pixel which composes the image data are converted into the corresponding CMYK scale values respectively based on the color conversion table 161. Thus, the inputted image data is converted into the CMYK data according to the color conversion table 161 and stored in the converted CMYK data storing area 1122 of the RAM 112. According to the converted CMYK data, an amount of the K ink to be ejected is determined based on the K-scale values, and black pixels are not reproduced by blending the CMY colored inks.

A CMY conversion table (not shown), which is stored in the CMY conversion table storing area 1164, is a table to covert the data represented in 256-scale values in the sRGB format into 256-scale values in CMY format. Each of the CMY scale values is defined to correspond to the sRGB scale value respectively. The CMY format is a format to represent colors by using three colors, which are the three primary colors (cyan, magenta, and yellow), and the color is reproduced by a combination of the three values that are C value, M value, and Y value. The CMY conversion table is created also by a known method and preliminarily stored in a predetermined storing area of the HDD 116. According to the converted CMY data, black pixels are reproduced by blending the three (CMY) colored inks.

Thereafter, a known random dithering (see S19 in FIG. 8) is applied to the medium-color dependent data stored in the medium-color dependent data storing area 1123 so that the print data, in which a color of each pixels therein is binarized (i.e., indication as to whether each of the CMYW inks is ejected or not ejected), is created. In the present embodiment, the inkjet head 11 is controlled according to binarized W data in the print data. The W data in the print data can be used to control the inkjet head 11 to reciprocate over a same line for a plurality of times to eject the white ink on the same pixels prior to ejecting the other colored inks in order to assure whiteness.

Figure 8:
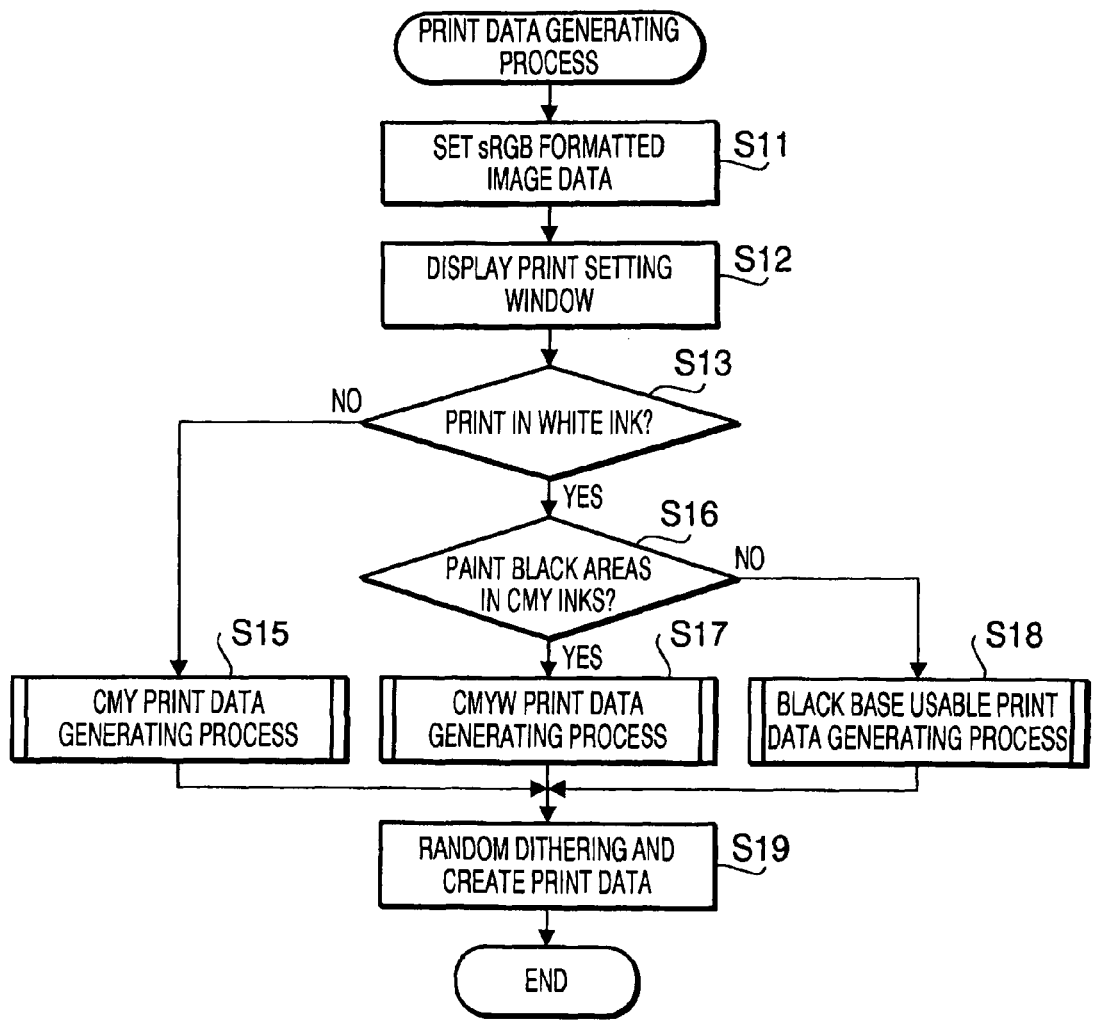
FIG. 8 is a flowchart to illustrate the print data generating process to be executed in the PC according to the first embodiment of the present invention.
Figure 9:
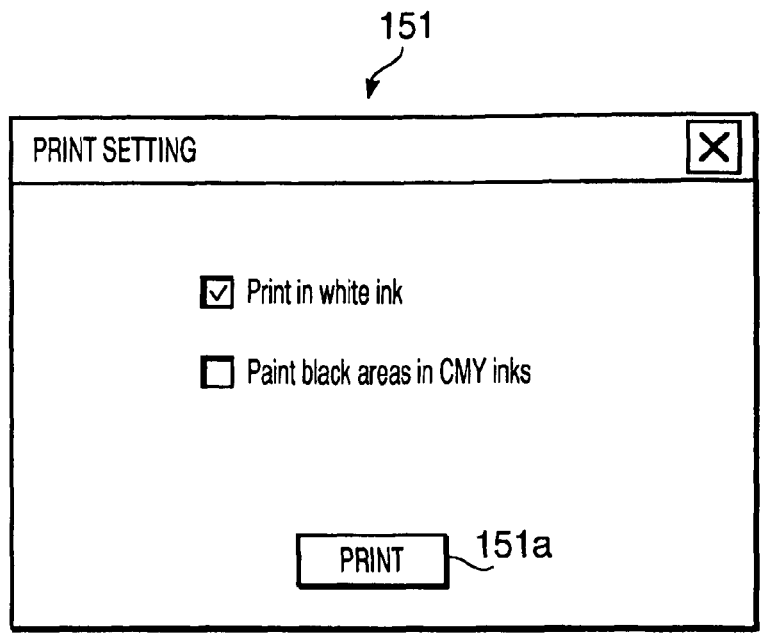
FIG. 9 illustrates a window for print setting to be displayed on a screen of a monitor according to the first embodiment of the present invention.
Figure 10:
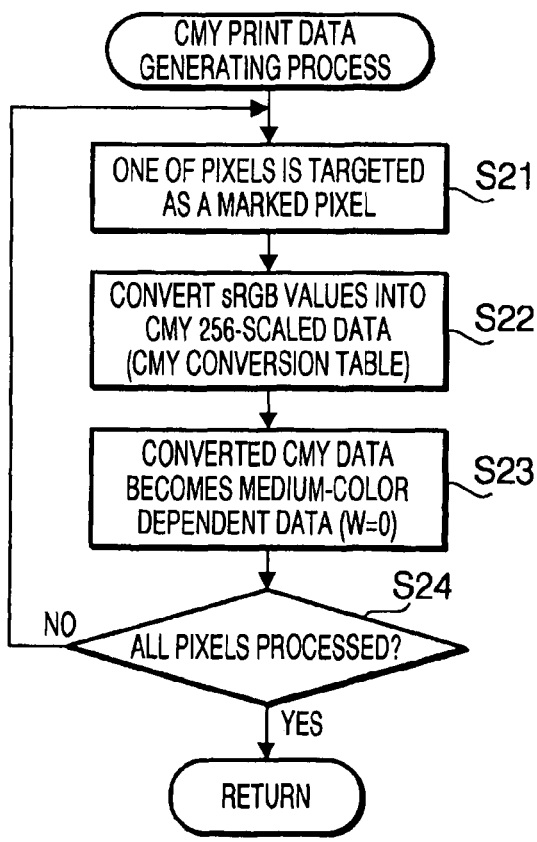
FIG. 10 is a flowchart to illustrate a CMY print data generating process to be executed in the PC according to the first embodiment of the present invention.
Figure 11:
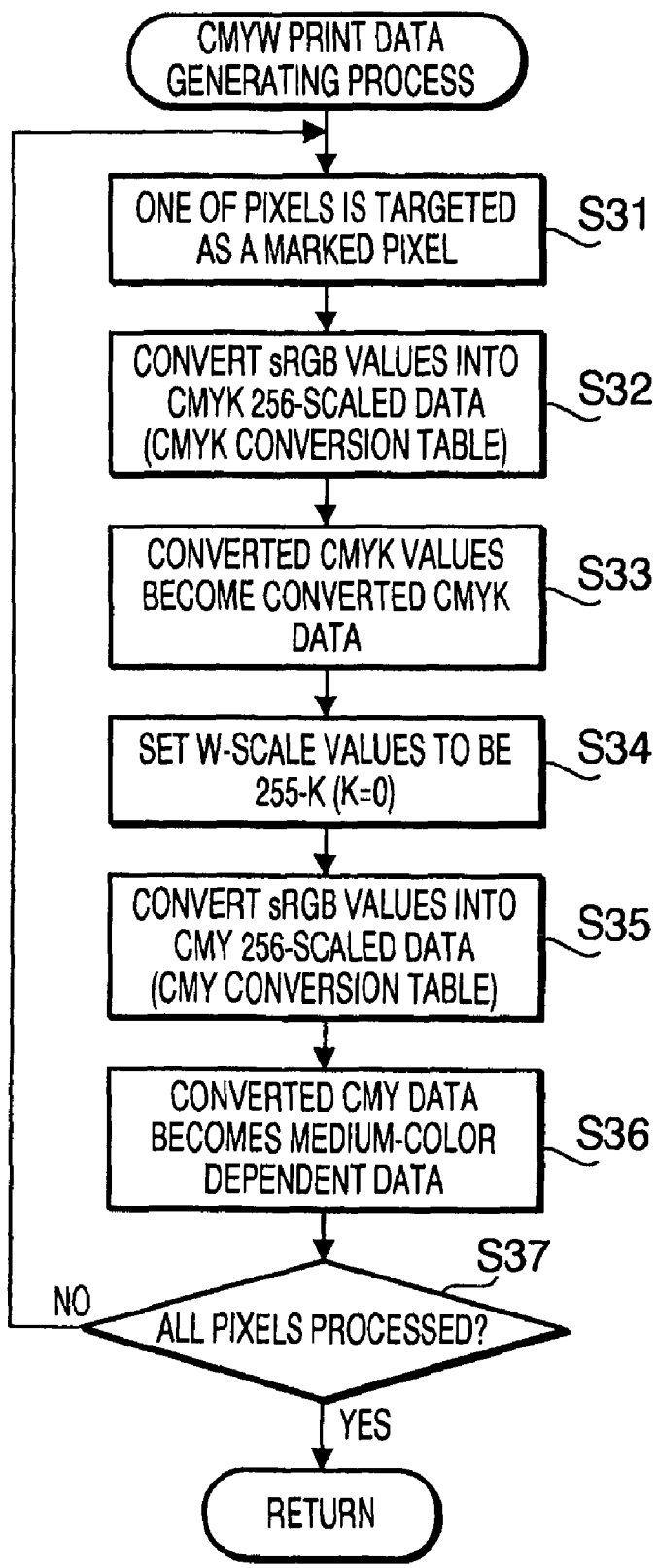
FIG. 11 is a flowchart to illustrate a CMY print data generating process to be executed in the PC according to the first embodiment of the present invention.
Figure 12:
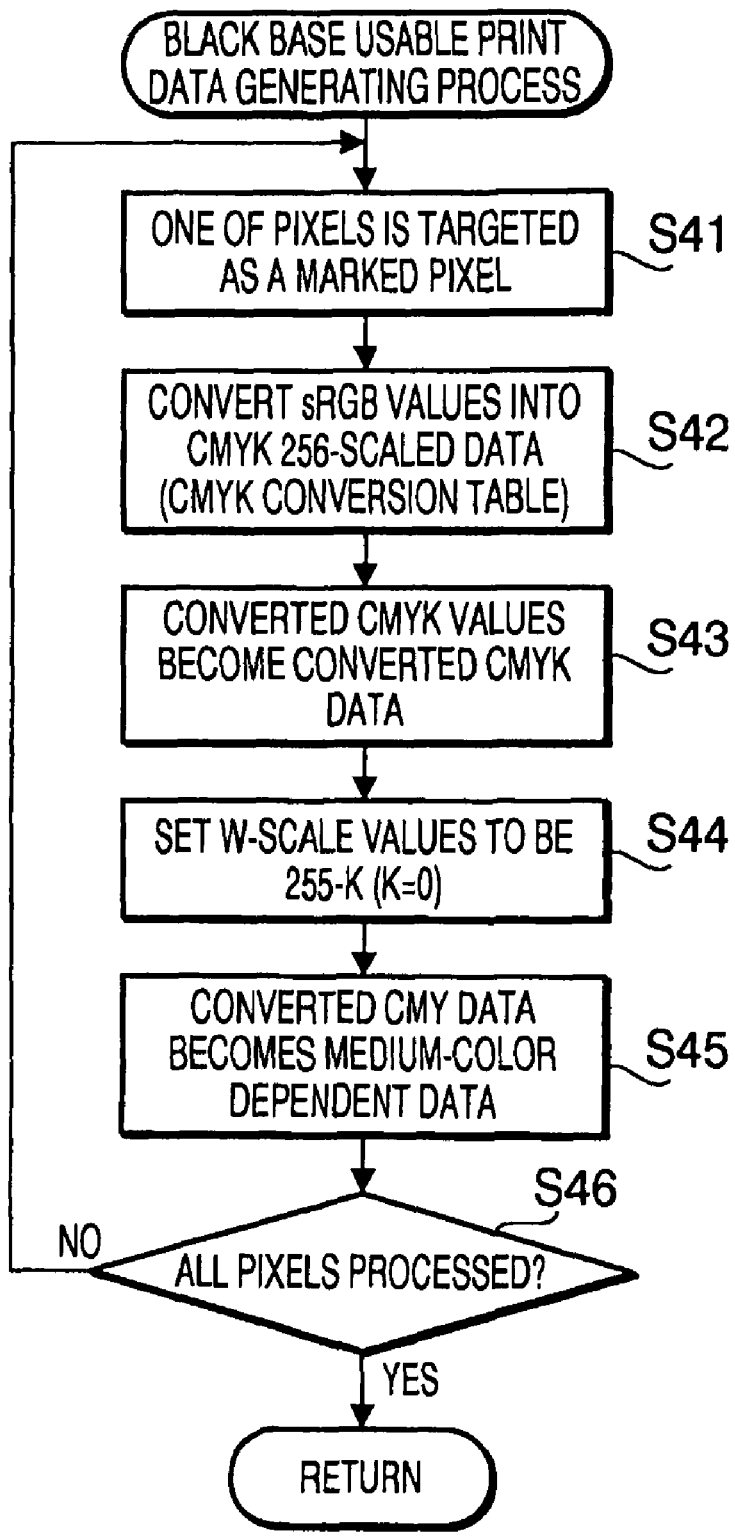
FIG. 12 is a flowchart to illustrate a print data generating process for a black base layer to be executed in the PC according to the first embodiment of the present invention.

Next, the print data generating process according to the present embodiment will be described with reference to FIGS. 8-12. FIG. 8 is a flowchart to illustrate the print data generating process to be executed in the PC 100 according to the first embodiment of the present invention. FIG. 9 illustrates a print setting window 151 to be displayed on a screen of a monitor 133 according to the first embodiment of the present invention. FIG. 10 is a flowchart to illustrate a CMY print data generating process to be executed in the PC 100 according to the first embodiment of the present invention. FIG. 11 is a flowchart to illustrate a CMY print data generating process to be executed in the PC 100 according to the first embodiment of the present invention. FIG. 12 is a flowchart to illustrate a print data generating process for a black base layer to be executed in the PC 100 according to the first embodiment of the present invention.

When an instruction to start a printing operation for the image data stored in the inputted image data storing area 1165 is entered by the user in the PC 100, the printer driver is activated, and the CPU 110 starts the print data generating process according to a print data generating program.

When the print data generating process starts, in S11, as shown in FIG. 8, the image data to be printed in the image data storing area 1165 of the HDD 116 is read out to be set in the inputted image data storing area 1121 of the RAM 112. Thereafter, in S12, a print setting window 151 is displayed on the screen of the monitor 133. In the print setting window 151, initially, as shown in FIG. 9, solely a print setting "print in white" is selectable. Activation of the "print in white" setting enables the white ink to be ejected to form the base layer and white areas in the image. When the user selects the "print in white ink" setting, an additional print setting "paint black areas in CMY inks" becomes selectable accordingly In S13, it is determined as to whether the user selects to activate the "print in white ink" setting. If the user operates a "print" button 151a without selecting the "print in white ink" setting (S13: NO), in S15, a CMY print data generating process (FIG. 10), in which the CMY print data is generated, is executed.

As shown in FIG. 10, as the CMY print data generating process starts, in S21, one of pixels which composes the image data is targeted as a currently marked pixel, and the sRGB values of the marked pixel is read out. Thereafter, in S22, the read-out sRGB values are converted into 256-scaled data in the CMY format. In the conversion of the sRGB values, the CMY conversion table stored in the CMY conversion table storing area 1164 of the HDD 116 is used. Thereafter, in S23, each of the CMY scale values of the converted CMY data being the medium-color dependent data is stored in the medium-color dependent data storing area 1123 of the RAM 112. The W-scale values in the medium-color dependent data are cleared to zero so that the W ink is not used to print the CMY print data. Thereafter, in S24, it is judged as to whether the above steps are applied to all the pixels included in the image data. If a pixel remains unprocessed (S24: NO), the process returns to S21, and a next pixel is targeted as a marked pixel. If all the pixels are processed (S24: YES), the process returns to the print data generating process shown in FIG. 8.

Following the CMY print data generating process in S15, in S19, a random dithering process is applied to the medium-color dependent data stored in the medium-color dependent data storing area 1123. According to the random dithering process in S19, the medium-color dependent data in 256-scale values is converted to create the binarized CMY print data. The created CMY print data is stored in the print data storing area 1124. The random dithering is a known method to degrade 256-scaled data into binarized data. The print data generating process is terminated thereafter.

In S13, if the user selects to activate the "print in white ink" setting (S13: YES) and "paint black areas in CMY inks" setting in the print setting window 151 (FIG. 9) and operates the "print" button 151a (S16: YES), in S17, a CMYW print data generating process is executed. In the CMYW print data generating process, CMYW print data, which is preferable to print an image on a recording medium with a color thereof being other than white or black, is generated.

As the CMYW print data generating process starts, as shown in FIG. 11, in S31, one of pixels which composes the image data is targeted as a currently marked pixel, and the sRGB values of the marked pixel is read out. Thereafter, in S32, the read-out sRGB values are converted into 256-scaled data in the CMYK format. In the conversion of the sRGB values, the CMYK conversion table 161 (FIG. 7) stored in the CMYK conversion table storing area 1163 of the HDD 116 is used. Thereafter, in S33, each of the CMYK scale values of the converted CMYK data is stored in the CMYK data storing area 1122 of the RAM 112.

Following S33, in S34, the W-scale values for medium-color dependent data are obtained based on the K-scale values in the converted CMYK data and the equation "W=255-K." The obtained W-scale values are set to be the W-scale values in the medium-color dependent data and stored in the medium-color dependent data storing area 1123. Thus, the inverted K-scale values are obtained to be the W-scale values in the converted CMYK data. In this regard, the K-scale values in the converted CMYK data are utilized in order to obtain the W-scale value. Meanwhile, the K-scale values in the CMYW print data are set to be zero.

In S35, the sRGB values read out in S31 are converted into 256-scaled data in the CMY format according to the CMY conversion table. Thereafter, in S36, each of the CMY scale values of the converted CMY data is stored in the medium-color dependent data storing area 1123 of the RAM 112 to be the CMY scale values of the medium-color dependent data. Namely, the medium-color dependent data generated in the CMYW print data generating process is configured with CMY scale values, which can reproduce black by blending the CMY colored inks, and the W-scale values, which can be obtained by inverting the K-scale values in the converted CMYK data. In S37, it is judged as to whether the above steps S31-36 are applied to all the pixels included in the image data. If a pixel remains unprocessed (S37: NO), the process returns to S31, and a next pixel is targeted as a marked pixel. If all the pixels are processed (S37: YES), the process returns to the print data generating process shown in FIG. 8.

Following the CMYW print data generating process in S17, in S19, the random dithering process is applied to the medium-color dependent data stored in the medium-color dependent data storing area 1123. According to the random dithering process in S19, the medium-color dependent data in 256-scale values is converted to create the binarized CMYW print data. The created CMYW print data is stored in the print data storing area 1124. The print data generating process is terminated thereafter.

In S13, if the user selects to activate the "print in white ink" setting (S13: YES) but does not select to activate "paint black areas in CMY inks" setting in the print setting window 151 (FIG. 9) and operates the "print" button 151a (S16: NO), in S18, a black base usable print data generating process is executed. In the black base usable print data generating process, black base usable print data, which is preferable to print an image on a recording medium with a color thereof being black, is generated.

As the black base usable print data generating process starts, as shown in FIG. 12, in S41, one of pixels which composes the image data is targeted as a currently marked pixel, and the sRGB values of the marked pixel is read out. Thereafter, in S42, the read-out sRGB values are converted into 256-scaled data in the CMYK format. In the conversion of the sRGB values, the CMYK conversion table 161 (FIG. 7) stored in the CMYK conversion table storing area 1163 of the HDD 116 is used. Thereafter, in S43, the converted CMYK data is stored in the converted CMYK data storing area 1122 of the RAM 112.

Following S43, in S44, the W-scale values for medium-color dependent data are obtained based on the K-scale values in the converted CMYK data and the equation "W=255-K." The obtained W-scale values are set to be the W-scale values in the medium-color dependent data and stored in the medium-color dependent data storing area 1123. Thereafter, in S45, each of the CMY scale values of the converted CMYK data is stored in the medium-color dependent data storing area 1123 of the RAM 112 to be the CMYK scale values of the medium-color dependent data. Namely, the medium-color dependent data generated in the black base usable print data generating process is configured with CMY scale values and the W-scale values, which can be obtained by inverting the K-scale values in the converted CMYK data. According to the black base usable data generated as above, areas to be represented in black are visualized by not ejecting any ink onto the areas while the areas are reproduced by ejecting K ink on the areas according to the converted CMYK data. In S46, it is judged as to whether the above steps S41-45 are applied to all the pixels included in the image data. If a pixel remains unprocessed (S46: YES), the process returns to the print data generating process shown in FIG. 8.

Following the black base usable print data generating process in S18, in S19, the random dithering process is applied to the medium-color dependent data stored in the medium-color dependent data storing area 1123. According to the random dithering process in S19, the medium-color dependent data in 256-scale values is converted to create the binarized black base usable print data. The created black base usable print data is stored in the print data storing area 1124. The print data generating process is terminated thereafter.

According to the above-described print data generating process to be executed in the PC 100, when the black base usable print data and the CMYW print data are generated, the W-scale values in the image to be printed can be obtained by inverting the K-scale values in the converted CMYK data so that a preferable amount of white ink to be ejected can be obtained. Therefore, the inkjet printer 1 is not required to perform an operation to form a base layer in solid white prior to an operation to form the image in colored inks, and the colored image in a higher quality can be achieved with less white ink.

According to the first embodiment, the PC 100 can create the CMY print data, which is preferable to print an image on a white recording medium, the CMYW print data, which is preferable to print an image on a recording medium with a color thereof being other than white or black, and the black base usable print data, by which a black color of a recording medium can be utilized according to the user's operation. Therefore, the user is allowed to operate the PC 100 to create the print data according to the color of the recording medium.

Figure 13:
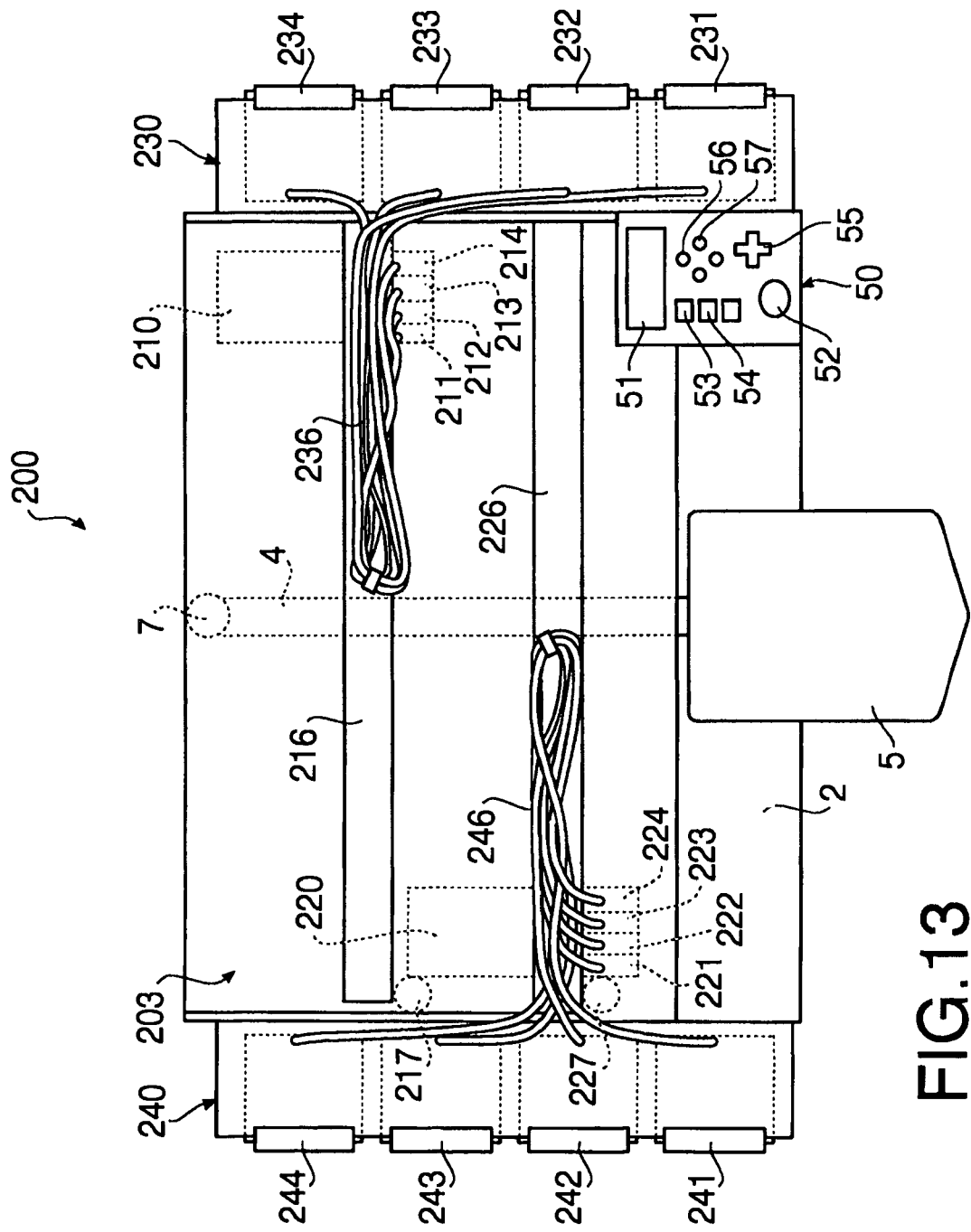
FIG. 13 is a plane view of an inkjet printer according to a second embodiment of the present invention.

Next, a second embodiment according to the present invention will be described with reference to FIGS. 13-19. FIG. 13 is a plane view of an inkjet printer 200 according to the second embodiment of the present invention.

The inkjet printer 200 according to the second embodiment is a printer configured similarly to the inkjet printer 100 in the first embodiment, but different in features that two carriages 210, 220 and two ink cartridge storages 230, 240 are provided instead of one carriage 10 and one ink cartridge storage 30. Therefore, a structure in the inkjet printer 200 similar to that of the inkjet printer 100 is referred to by an identical reference numeral, and description of that will be omitted.

As shown in FIG. 13, the inkjet printer 200 includes a flat base plate 2 at a bottom and a cover 203 to cover the entire body of the inkjet printer 200. At an approximately center but a relatively rear (i.e., closer to an upper side in FIG. 13) of the cover 203, above the platen 5, a first guide rail 216 to guide a first carriage 210 with four inkjet heads 211-214 mounted thereon is provided. In the vicinity of a left-hand end of the first guide rail 216, a first carriage motor 217 to drive the carriage 210 is provided, while a pulley (not shown) is provided in the vicinity of a right-hand end of the first guide rail 216. Further, a carriage belt (not shown) is drawn between the first carriage motor 217 and the pulley under the first guide rail 216. The carriage belt is fixed to the first carriage 210 so that the first carriage 210 is reciprocated along the first guide rail 216 in the right-and-left direction (i.e., a main scanning direction) when the carriage motor 217 is activated.

On the right-hand end of the cover 203, a first ink cartridge storage 230, in which four ink cartridges 231-234 having inks therein are detachably attached, is provided. Each of the ink cartridges 231-234 is connected to each of inkjet heads 211-214 by flexible ink supplying tubes 236 so that the inks stored in the ink cartridges 231-234 are supplied to each channel of the inkjet heads 211-214. According to the present embodiment, all of the inkjet heads 211-14 are provided to eject white ink therefrom, and the ink cartridges 231-234 respectively contain white ink.

At an approximately center but a relatively front (i.e., closer to a lower side in FIG. 13) portion of the cover 203, above the platen 5, a second guide rail 226, in parallel with the first guide rail 216, to guide a second carriage 220 with four inkjet heads 221-224 mounted thereon is provided. Further, a carriage belt (not shown) is drawn between the second carriage motor 227 and a pulley (not shown) under the second guide rail 226. The carriage belt is fixed to the second carriage 220 so that the second carriage 220 is reciprocated along the second guide rail 226 in the right-and-left direction (i.e., the main scanning direction) when the carriage motor 227 is activated.

In a left-end portion of the cover 203, a second ink cartridge storage 240, in which four ink cartridges 241-244 are stored, is provided. The ink cartridges 241-244 are respectively connected to the inkjet head 221-224 through ink supplying tubes 246 so that the inks in the ink cartridges 241-244 are supplied to each channel of the inkjet heads 221-24. The four ink cartridges 241-244 contain C ink, M ink, Y ink, and K ink respectively. At right-hand front of the inkjet printer 200 is provided an operation panel 50 to which a user inputs an instruction for the inkjet printer 200.

Figure 14:
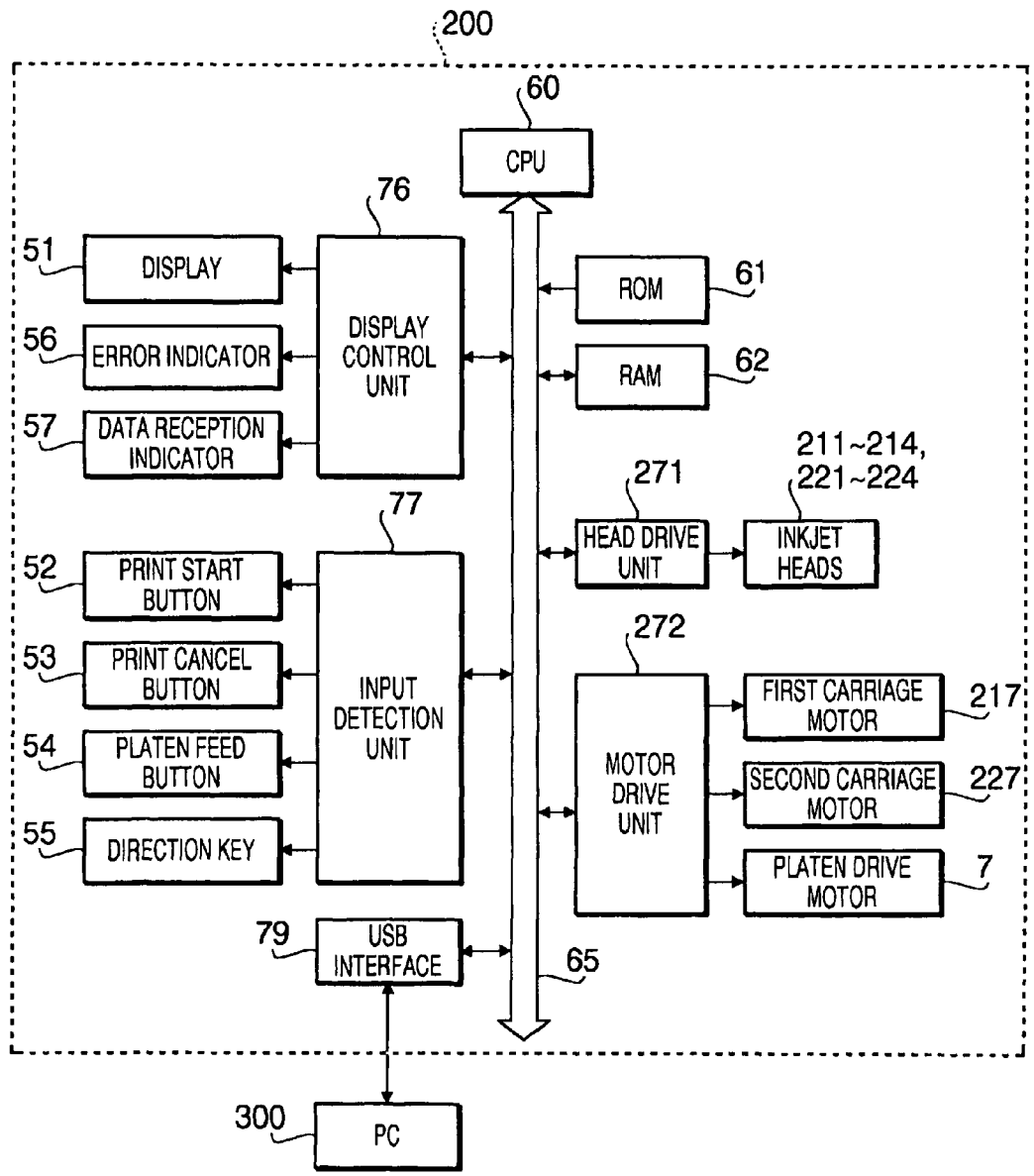
FIG. 14 is a block diagram to illustrate an electrical configuration of the inkjet printer according to the second embodiment of the present invention.

Next, referring to FIG. 14, an electrical configuration of the inkjet printer 200 will be described. FIG. 14 is a block diagram showing the electrical configuration of the inkjet printer 200 according to the present embodiment of the invention. A head drive unit 271 of the inkjet printer 200 is connected to each of the inkjet heads 211-214, 221-224 and activates the piezoelectric actuators being provided to each channel of the inkjet heads 211-214, 221-224. A motor drive unit 272 is connected to the first carriage motor 217, the second carriage motor 227, and a platen drive motor 27, which drives a platen roller (not shown) to adjust timing and speed to feed the platen 5 holding the fabric as a recording medium. The inkjet printer 200 is connected to the other devices such as a PC 300 through a USB interface 79. The remaining configuration of the inkjet printer 200 is similar to the inkjet printer 1 in the first embodiment; therefore, description of that will be omitted.

With the aforementioned configuration of the inkjet printer 200 according to the embodiment, when the print data transmitted from the PC 300 is received in the inkjet printer 200, the user sets a piece of fabric on the platen 5 and presses the print button 52. Accordingly, the platen 5 with the fabric is moved to rearward in the cover 203 of the inkjet printer 200 along the rail 4 by the platen drive motor 7 so that the position of the first carriage 210 with respect to the platen 5 corresponds to a recording start position. Thereafter, the inkjet heads 211-214 eject the inks as the first carriage 210 is moved from the right-hand side to the left-hand side in the cover 203 according to a recording instruction so that recording of one line is executed. Further, the platen 5 is moved to frontward from the rearward in the cover 203 for an amount corresponding to one line, and the inkjet heads 211-214 eject the inks as the first carriage 210 is moved from the right-hand side to the left-hand side in the cover 203 according to the recording instruction so that recording of the next line is executed. Subsequently, the platen 5 is moved to frontward from the rearward in the cover 203 for the amount corresponding to another one line portion. By repeating this operation, printing in white ink is executed. Next, the inkjet printer 200 moves the platen 5 with the fabric to frontward so that the position of the second carriage 220 with respect to the platen 5 corresponds to the recording start position. The second carriage 220 is driven similarly to the first carriage 210 as described above so that the colored (CMYK) inks are ejected onto the fabric according to the recording instruction. At the end of the printing operation, the platen 5 is fed forth to a position wherein the fabric can be removed, thus the user removes the fabric which underwent the printing operation. In the present embodiment, the inkjet heads 211-214 are controlled according to binarized W data in the print data. Namely, the W data in the print data is commonly used to control the inkjet heads 211-214.

Next, the PC 300 according to the second embodiment will be described. The PC 300 according to the second embodiment is a PC configured similarly to the PC 100 in the first embodiment, but different in a feature that the HDD 116 is not provided with the CMY conversion table storing area 1164 (FIG. 5). The remaining configuration of the PC 300 is identical with the PC 100, and a structure in the PC 300 similar to that of PC 100 is referred to by an identical reference numeral, and description of that will be omitted.

Figures 15, 16:
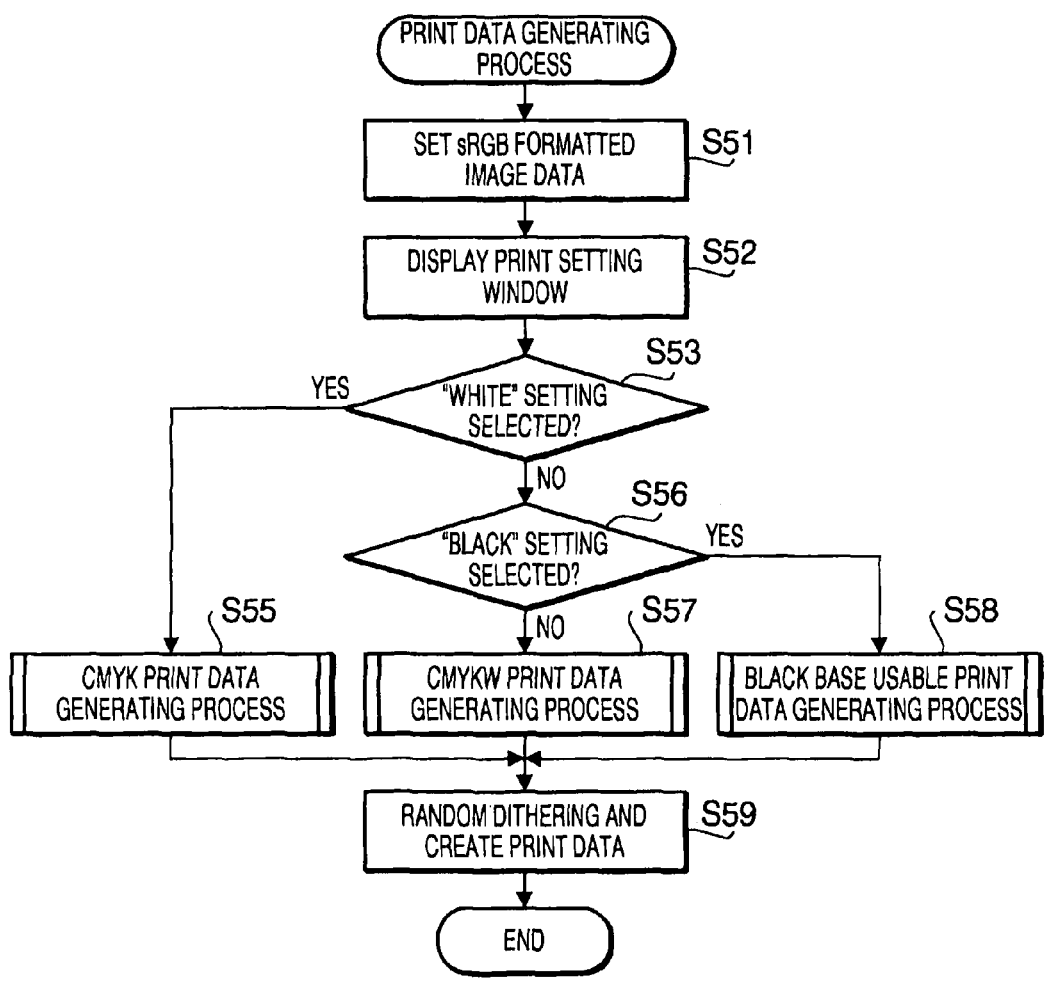
FIG. 15 is a chart to illustrate kinds and characteristics of print data generated in the PC according to the second embodiment of the present invention.
FIG. 16 is a flowchart to illustrate a print data generating process to be executed in the PC according to the second embodiment of the present invention.

Next, kinds and transition of the data which can be generated in the PC 300 according to the present embodiment will be described. FIG. 15 is a chart to illustrate kinds of the print data to be generated in the PC 300 according to the second embodiment of the present invention. As shown in FIG. 6, the print data to be generated in the PC 200 can be classified into three kinds, which are CMYK print data, CMYKW print data, and black base usable print data.

The CMYK print data is data to be used in the inkjet printer 200 for printing a colored image in four colored inks, which are cyan (C) ink, magenta (M) ink, yellow (Y) ink, and black (K) ink. The CMYK print data is preferable for printing the image on a recording medium of which color is white. When an area in the image is to be reproduced in white, inks, including white ink, are not ejected on pixels in the area so that the base color of the recording medium can be effectively utilized to visualize the white color. Therefore, the white ink can be effectively saved for the area. Further, an area in the image to be reproduced in black can be formed by ejecting the black ink in the area. When the black ink is used to reproduce black pixels, unlike blending the CMY inks in the area as described in the first embodiment, a less amount of ink is used for the area, and the black area can be reproduced in a higher quality.

The CMYKW print data is data to be used in the inkjet printer 200 for printing a colored image in the five (C, M, Y, K, W) colored inks. The W-scale values in the CMYKW print data are obtained by inverting K-scale values in the converted CMYK data, which are converted based on the CMYK conversion table 161 (FIG. 7). Therefore, a W-value is calculated by an equation W=255-K. Further, an area in the image to be reproduced in black can be formed by ejecting the black ink in the area.

According to the CMYKW print data, the white ink is ejected to form a pixel representing white. Meanwhile, in order to form a colored pixel, a preferable amount of white ink is ejected to form a base layer prior to ejecting the colored inks. Further, a black pixel is formed by the black ink. Therefore, according to the second embodiment, it is preferable that the color of the recording medium to be used in the inkjet printer 200 to print the CMYKW print data is any color other than white or black.

The black base usable print data is preferable to print an image on a recording medium of which color is black. When the black base usable print data is used to print an image on a recording medium with the color thereof being black, the color of the recording medium can be effectively utilized, and the black ink which is otherwise ejected on the recording medium to form the black pixels can be effectively saved. The black base usable print data is identical with the black base usable print data which has been described in the first embodiment; therefore, description of that will be omitted.

Figure 17:
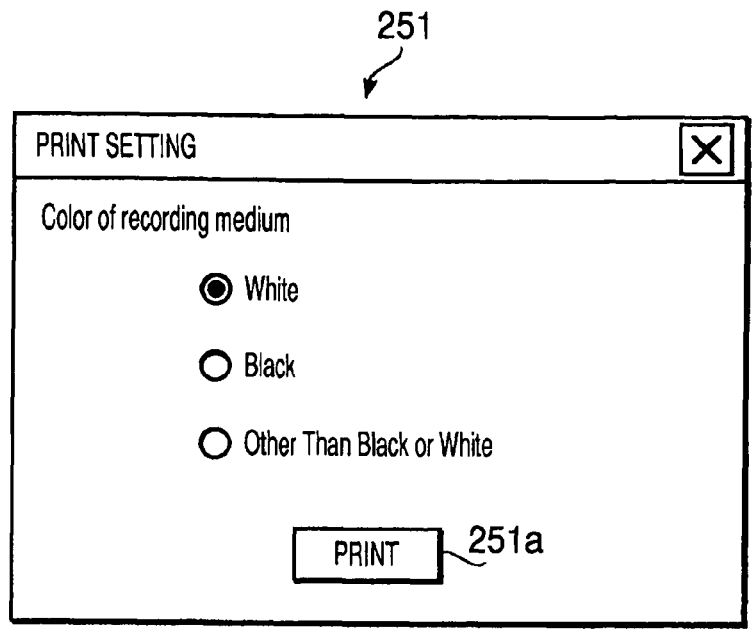
FIG. 17 illustrates a window for print setting to be displayed on a screen of a monitor according to the second embodiment of the present invention.
Figure 18:
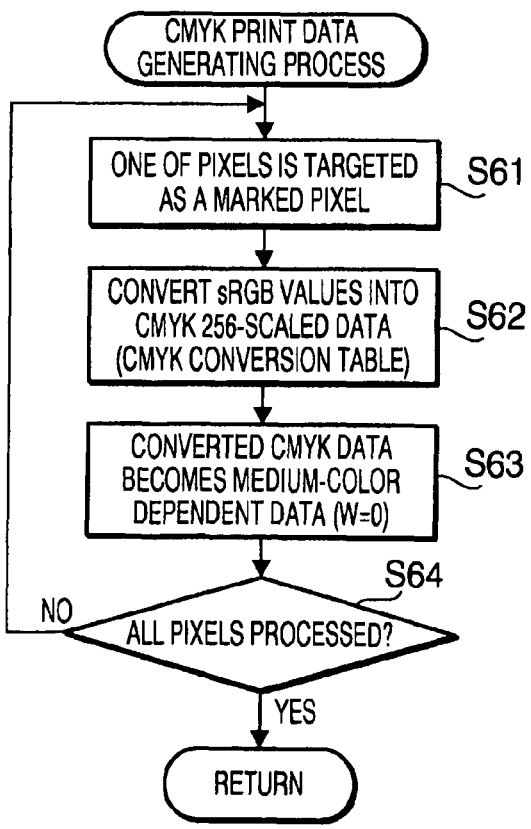
FIG. 18 is a flowchart to illustrate a CMYK print data generating process to be executed in a PC according to the second embodiment of the present invention.
Figure 19:
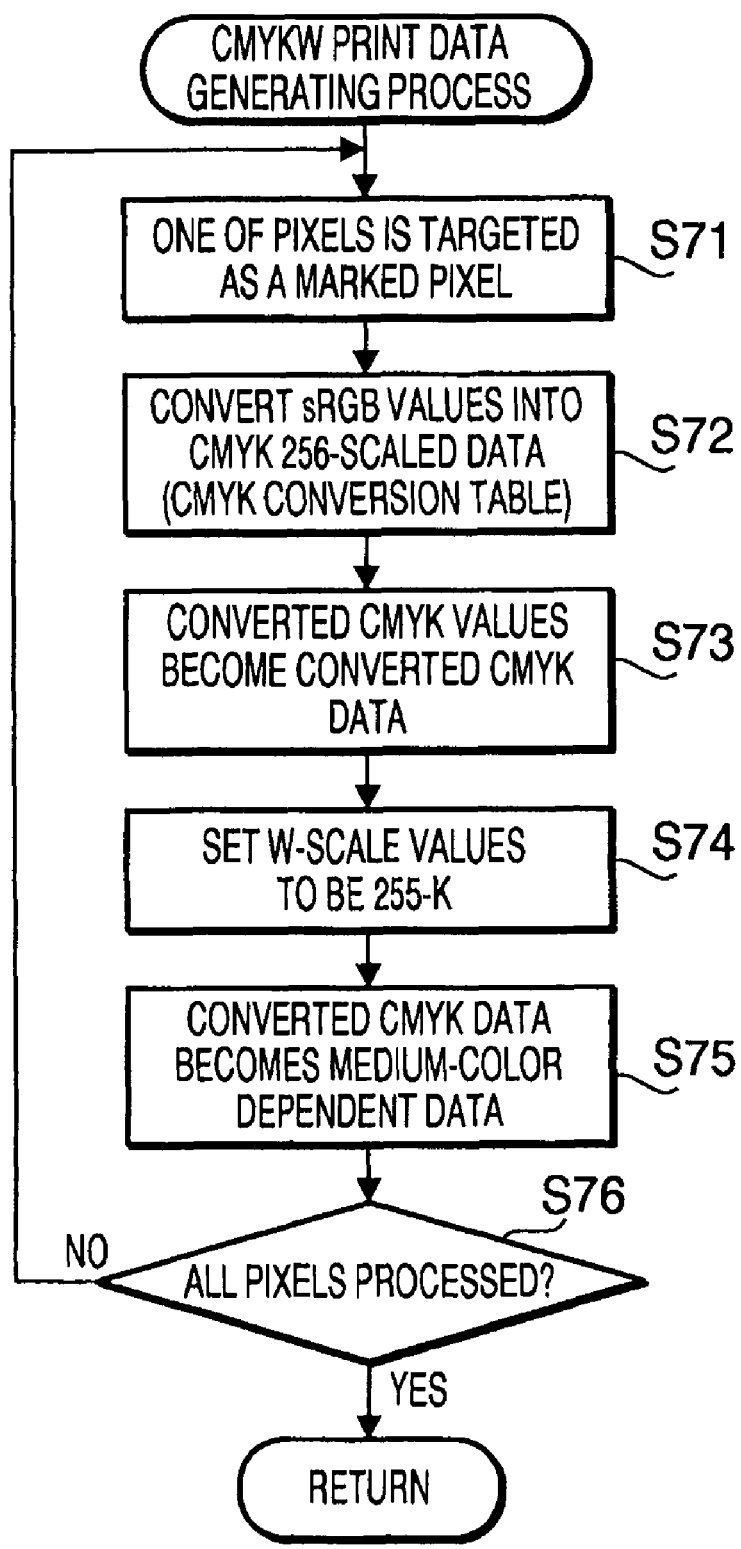
FIG. 19 is a flowchart to illustrate a CMYKW print data generating process to be executed in the PC according to the second embodiment of the present invention.

Next, the print data generating process according to the present embodiment will be described with reference to FIGS. 16-19. FIG. 16 is a flowchart to illustrate the print data generating process to be executed in the PC 300 according to the second embodiment of the present invention. FIG. 17 illustrates a print setting window 251 to be displayed on a screen of a monitor 133 according to the second embodiment of the present invention. FIG. 18 is a flowchart to illustrate a CMYK print data generating process to be executed in the PC 300 according to the second embodiment of the present invention. FIG. 19 is a flowchart to illustrate a CMYKW print data generating process to be executed in the PC 300 according to the second embodiment of the present invention.

When the print data generating process starts, in S51, as shown in FIG. 16, the image data to be printed in the image data storing area 1165 of the HDD 116 is read out to be set in the inputted image data storing area 1121 of the RAM 112.

Thereafter, in S52, a print setting screen 251 is displayed on the screen of the monitor 133. In the print setting screen 251, as shown in FIG. 17, one of color types of the recording medium to be used can be selected among "white," "black," and "other than white or black." When the user operates the "print" button 251a, in S53, it is determined as to whether the user selected the "white" setting. If the user selected the "white" setting (S53: YES), in S55, a CMYK print data generating process, in which the CMYK print data being preferable for printing the image on a white recording medium is generated, is executed.

As shown in FIG. 18, as the CMYK print data generating process starts, in S61, one of pixels which composes the image data is targeted as a currently marked pixel, and the sRGB values of the marked pixel is read out. Thereafter, in S62, the read-out sRGB values are converted into 256-scaled data in the CMYK format. In the conversion of the sRGB values, the CMYK conversion table 161 stored in the CMYK conversion table storing area 1163 of the HDD 116 is used. Thereafter, in S63, each of the CMYK scale values of the converted CMYK data being the medium-color dependent data is stored in the medium-color dependent data storing area 1123 of the RAM 112. The W-scale values in the medium-color dependent data are represented by zero so that the W ink is not used to print the CMYK print data. Thereafter, in S64, it is judged as to whether the above steps S61-S63 are applied to all the pixels included in the image data. If a pixel remains unprocessed (S64: NO), the process returns to S61, and a next pixel is targeted as a marked pixel. If all the pixels are processed (S64: YES), the process returns to the print data generating process shown in FIG. 16.

Following the CMYK print data generating process in S55, in S59, the random dithering process is applied to the medium-color dependent data stored in the medium-color dependent data storing area 1123. According to the random dithering process in S59, the medium-color dependent data in 256-scale values is converted to create the binarized CMYK print data. The created CMYK print data is stored in the print data storing area 1124. The print data generating process is terminated thereafter.

If the user did not select neither of the "white" setting in S53 (S53: NO) nor the "black" setting in S56 (S56: NO) (i.e., the "other than white or black" setting is selected), in S57, a CMYKW print data generating process, in which the CMYKW print data being preferable for printing the image on a recording medium with a color thereof being other than white or black is generated, is executed.

As shown in FIG. 19, as the CMYKW print data generating process starts, in S71, one of pixels which composes the image data is targeted as a currently marked pixel, and the sRGB values of the marked pixel is read out. Thereafter, in S72, the read-out sRGB values are converted into 256-scaled data in the CMYK format. In the conversion of the sRGB values, the CMYK conversion table 161 stored in the CMYK conversion table storing area 1163 of the HDD 116 is used. Thereafter, in S73, each of the CMYK scale values of the converted CMYK data being the medium-color dependent data is stored in the medium-color dependent data storing area 1123 of the RAM 112.

Following S73, in S74, the W-scale values for medium-color dependent data are obtained based on the K-scale values in the converted CMYK data and the equation "W=255-K." The obtained W-scale values are set to be the W-scale values in the medium-color dependent data and stored in the medium-color dependent data storing area 1123. Thereafter, in S75, each of the CMYK scale values of the converted CMYK data is stored in the medium-color dependent data storing area 1123 of the RAM 112 as it is to be the CMYK scale values of the medium-color dependent data. Namely, the medium-color dependent data generated in the CMYK print data generating process is configured with CMYK scale values and the W-scale values, which can be obtained by inverting the K-scale values in the converted CMYK data. In S76, it is judged as to whether the above steps S71-75 are applied to all the pixels included in the image data. If a pixel remains unprocessed (S76: YES), the process returns to the print data generating process shown in FIG. 16.

Following the CMYKW print data generating process in S57, in S59, the random dithering process is applied to the medium-color dependent data stored in the medium-color dependent data storing area 1123. According to the random dithering process in S59, the medium-color dependent data in 256-scale values is converted to create the binarized CMYKW print data. The created CMYKW print data is stored in the print data storing area 1124. The print data generating process is terminated thereafter.

If the user did not select the "white" setting in S53 (S53: NO) but selects the "black" setting in S56 (S56: YES), in S58, a black base usable print data generating process (FIG. 12), in which the black base usable print data being preferable for printing the image on a recording medium with a color thereof being black is generated, is executed. Description of the black base usable print data generating process is herein omitted.

Following the black base usable print data generating process in S58, in S59, the random dithering process is applied to the medium-color dependent data stored in the medium-color dependent data storing area 1123. Thus, the binarized black base usable print data is created. The created black base usable print data is stored in the print data storing area 1124. The print data generating process is terminated thereafter.

According to the second embodiment, the PC 300 can create the CMYKW print data, which is print data to reproduce an image in the CMYK inks and the W ink. According to the CMYKW print data, a base layer for the colored image and white pixels can be formed by ejecting the white ink, and black pixels can be formed by ejecting the black ink, which can more preferably reproduce the color of black than combination of the CMY inks. Therefore, print data for a higher image quality and ink-usage efficiency can be created regardless of a color of the recording medium.

Further, the PC 300 can create preferable print data for the color of the recording medium to be used according to the user's input to specify one of the three kinds of the color. More specifically, if the user's input indicates the color to be white, the CMYK print data, which is capable of reproducing a black color in the black ink, is created. If the user's input indicates the color to be other than black or white, the CMYKW print data, by which an image in a higher quality can be reproduced regardless of the color of the recording medium, is created. If the user's input indicates the color to be black, the black base usable print data, by which the black color of the recording medium can be effectively utilized, is created. Therefore, an image which is preferably adjusted to achieve the higher quality according to the color of the recording medium can be obtained by the inkjet printer 200 with the single set of inks.

Although examples of carrying out the invention have been described, those skilled in the art will appreciate that there are numerous variations and permutations of the print data generating device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, it is to be noted in the first embodiment that the user specifies the method to print the image (i.e., as to whether the white ink is used and black pixels are formed by combination of the colored inks) rather than the color of the recording medium. However, similarly to the PC 300 in the second embodiment, the PC 100 in the first embodiment can be configured to accept the user's input to specify the color of the recording medium so that the print data can be generated according to the color of the recording medium. In this configuration, according to the print data generating process shown in FIG. 8, when the "white" setting is selected, the CMY print data is generated in S15. When the "other than white or black" setting is selected, the CMYW print data is generated in S17. When the "black" setting is selected, the black base usable print data is generated in S18. In reverse, the PC 100 in the first embodiment can be configured to accept the user's input to specify the color of the recording medium.

For another example, the kinds of the print data (i.e., the CMY print data, the CMYW print data, and the black base usable print data in the first embodiment) is not necessarily limited to three, but may be two, including the black base usable print data and the CMY print data, and the CMYW print data may be omitted. The user may specify one of the methods or the color of the recording medium. When the user specifies the color of the recording medium to be "black," the black base usable print data can be generated, and when the user specifies the color of the recording medium to be "white," the CMY print data can be generated. The two kinds of print data to be generated may be the black base usable print data and the CMYW print data, and the CMY print data may be omitted. Further, the two kinds of print data to be generated may include the black base usable print data and the CMYKW print data (alternatively, the CMYK print data) in the second embodiment. Furthermore, the kinds of the print data to be generated in a single PC may include all of the above-mentioned kinds of print data.

Optionally, a sensor to detect a color of the recording medium may be equipped so that the kind of the print data to be generated may be determined based on the detected result.

Further, in the above embodiments, the image data in sRGB format is converted into the print data in the CMYK format or the CMY format. However, the image data may be represented in CMYKW format or a data format to represent another color space such as HSV format. The CMYK conversion table 161 can be replaced with another table to define the correspondences between one data format and the other data format accordingly. Further, the method to convert the data may be arbitrarily modified. For example, data in the sRGB format may be firstly converted into an RGB format, and the converted values (i.e., RGB values) may be further converted into the CMYK format based on a known UCR and GCR. Furthermore, the scale of the color data is not limited to 256.

In the above embodiments, it is to be noted that the K-scale values in 256-scales in the CMYK format is inverted, and the inverted values are binarized by random dithering to obtain the W-scale values in the print data. However, the method to obtain the W-scale values is not limited. For example, the inverted K-scale values may be corrected based on a tone curve graph and further binarized to obtain the W-scale values for the print data. The correction based on the tone curve graph is a known method to correct scale values. The horizontal axis of the graph represents original tone values of the image (i.e., input values), and the vertical axis represents changed tone values (i.e., output values), and the correspondence between the input values and the output values are defined by a sloped curve or a line. A table defying the correspondence can be preliminarily stored, for example, in the HDD 116 and referred to in order to obtain the corrected W-scale values (i.e., the output values) in 256-scales. In this regard, the inverted K-scale values are the input values. Accordingly, for example, brightness of the entire image can be arbitrarily adjusted so that an image in a more desirable quality can be obtained. Various other processes can be applied to the values obtained by inverting the K-scale values, and the W-scale values can be obtained by binarizing the processed values.

Furthermore, the configuration of the inkjet printers 1, 200 is not limited. In the inkjet printer 200, for example, in place of the first carriage 10 with the inkjet heads 11-14 for ejecting white ink and the second carriage 20 with the inkjet heads 21-24 for ejecting colored inks, one carriage with five inkjet heads may be used in the inkjet printer 200 to output the print data generated by the print data generating device according to the present invention.

What is claimed is:

1. A print data generating apparatus to generate print data, which is to be used in a printing apparatus to form an image in a plurality of colorants, based on originally inputted image data representing the image, comprising:
   a black enabled image data converter unit configured to convert the inputted image data into black enabled image data, the black enabled image data indicating scale values of a plurality of colors including a black color to be used in the image, the black enabled image data being represented in a color space configured with colors of CMYK, which are cyan, magenta, yellow, and black;
   a white scale value calculator unit configured to obtain scale values of a white color to be used in the image to be formed, the white scale value calculator unit calculating the scale values of the white color by inverting the scale values of the black color obtained by the black enabled image data converter unit; and
   a CMY data converter unit configured to convert the inputted image data into CMY data, the CMY data indicating the scales values of the plurality of colors in CMY colors, the black color in the image according to the CMY data being represented by combination of CMY colorants, wherein CMY are cyan, magenta and yellow; and
   a CMY print data generator unit configured to generate CMY print data including the scale values of the white color and the CMY colors.

2. The print data generating apparatus according to claim 1, wherein the inputted image data is represented in a color space configured with colors of RGB, which are red, green, and blue.

3. The print data generating apparatus according to claim 1, comprising a black base usable print data generator unit configured to generate black base usable print data, the black base usable print data indicating the scale values of the colors in the image in the CMYK colors and the white color,
   wherein the black base usable print data includes the scale values of the white color obtained by the white scale value calculator unit and the scale values of the black color being zero.

4. The print data generating apparatus according to claim 3, wherein no colorant is used to form an area in the image corresponding to the scale values of the black color when the image is formed according to the black base usable print data.

5. The print data generating apparatus according to claim 4, wherein the black base usable print data is used to form the image on a recording medium of which color is black.

6. The print data generating apparatus according to claim 1, wherein the scale values of the white color are cleared to zero in the CMY print data; and
   wherein no colorant is used to form an area in the image corresponding to the scale values of the white color when the image is formed according to the CMY print data.

7. The print data generating apparatus according to claim 6, wherein the CMY print data is used to form the image on a recording medium of which color is white.

8. The print data generating apparatus according to claim 1, wherein the CMY print data generator unit includes a CMYW print data generator unit to generate CMYW print data, the CMYW print data including the scale values of the white color obtained by the white scale value calculator unit and the scale values of the CMY colors, wherein CMYW are cyan, magenta, yellow and white.

9. The print data generating apparatus according to claim 1, further comprising:
   a CMYK data converter unit configured to convert the inputted image data into CMYK data, the CMYK data indicating the scales values of the plurality of colors in CMYK colors; and
   a CMYKW print data generator unit configured to generate CMYKW print data including the scale values of the white color obtained by the white scale value calculator unit and the scale values of the CMYK colors obtained by the CMYK data converter unit, wherein CMYKW are cyan, magenta, yellow, black and white.

10. The print data generating apparatus according to claim 1, comprising:
   a black base usable print data generator unit configured to generate black base usable print data, the black base usable print data indicating the scale values of the colors in the image in the CMYK colors and the white color, the black base usable print data including the scale values of the white color obtained by the white scale value calculator unit and the scale values of the black color being zero; and
   a CMY data converter unit configured to convert the inputted image data into CMY data, which indicates the scales values of the plurality of colors in CMY colors;
   a CMY print data generator unit configured to generate CMY print data including the scale values of the white color being zero and the CMY colors, the black color in the image according to the CMY data being represented by combination of CMY colorants; and
   a first selecting unit configured to select one of the black base usable print data generator unit and the CMY print data generator unit to be used to generate the print data.

11. The print data generating apparatus according to claim 10, further comprising an input unit configured to input a color of a recording medium on which the image is formed,
wherein the first selecting unit selects the one of the black base usable print data generator unit and the CMY print data generator unit to be used to generate the print data according to the color of the recording medium inputted by the input unit.

12. The print data generating apparatus according to claim 11,
wherein the first selecting unit selects the black base usable print data generator unit when the color of the recording medium inputted by the input unit is black; and
wherein the first selecting unit selects the CMY print data generator unit when the color of the recording medium inputted by the input unit is white.

13. The print data generating apparatus according to claim 12, further comprising a CMYW print data generator unit configured to generate CMYW print data including the scale values of the white color obtained by the white scale value calculator unit and the scale values of the CMY colors, wherein CMYW are cyan, magenta, yellow and white;
wherein the first selecting unit selects the CMYW print data generator unit to be used to generate the print data when the color of the recording medium inputted by the input unit is any color excluding black and white.

14. The print data generating apparatus according to claim 1, comprising:
a black base usable print data generator unit configured to generate black base usable print data, which indicates the scale values of the colors in the image in the CMYK colors and the white color, the black base usable print data including the scale values of the white color obtained by the white scale value calculator unit and the scale values of the black color being zero;
a CMYK data converter unit configured to convert the inputted image data into CMYK data, the CMYK data indicating the scales values of the plurality of colors in CMYK colors;
a CMYKW print data generator unit configured to generate CMYKW print data including the scale values of the white color obtained by the white scale value calculator unit and the scale values of the CMYK colors obtained by the CMYK data converter unit, wherein CMYKW are cyan, magenta, yellow, black and white; and
a second selecting unit configured to select one of the black base usable print data generator unit and the CMYKW print data generator unit to be used to generate the print data.

15. The print data generating apparatus according to claim 14, further comprising an input unit configured to input a color of a recording medium on which the image is formed,
wherein the second selecting unit selects the one of the black base usable print data generator unit and the CMYKW print data generator unit to be used to generate the print data according to the color of the recording medium inputted by the input unit.

16. The print data generating apparatus according to claim 15,
wherein the second selecting unit selects the black base usable print data generator unit when the color of the recording medium inputted by the input unit is black; and
wherein the second selecting unit selects the CMYKW print data generator unit when the color of the recording medium inputted by the input unit is a color other than black.

17. The print data generating apparatus according to claim 16, further comprising a CMYK print data generator unit configured to generate CMYK print data including the scale values of the scale values of the CMYK colors obtained by the CMYK data converter unit;
wherein the second selecting unit selects the CMYK print data generator unit to be used to generate the print data when the color of the recording medium inputted by the input unit is any color excluding black and white.

18. A printing apparatus, comprising:
an image printing unit configured to print an image in a plurality of colorants including at least cyan colorant, magenta colorant, yellow colorant and white colorant; and
a controller configured to control behaviors of the image printing unit according to print data being generated in a method including steps of:
converting inputted image data into black enabled image data, the black enabled image data indicating scale values of a plurality of colors including a black color to be used in the image, the black enabled image data being represented in a color space configured with colors of CMYK, which are cyan, magenta, yellow, and black; and
calculating to obtain scale values of the white colorant to be used to form the image, the scale values of the white colorant being obtained by inverting scale values of the black color obtained in the step of converting the inputted image data into the black enabled image data;
converting the inputted image data into CMY data, the CMY data indicating the scales values of the plurality of colors in CMY colors, the black color in the image according to the CMY data being represented by combination of CMY colorants, wherein CMY are cyan, magenta and yellow; and
generating CMY print data including the scale values of the white color and the CMY colors.

19. A method to generate print data to be used in a printing apparatus to form an image, based on originally inputted image data representing the image, comprising steps of:
converting inputted image data into black enabled image data, the black enabled image data indicating scale values of a plurality of colors including a black color to be used in the image, the black enabled image data being represented in a color space configured with colors of CMYK, which are cyan, magenta, yellow, and black; and
calculating to obtain scale values of the white colorant to be used to form the image, the scale values of the white colorant being obtained by inverting scale values of the black color obtained in the step of converting the inputted image data into the black enabled image data;
converting the inputted image data into CMY data, the CMY data indicating the scales values of the plurality of colors in CMY colors, the black color in the image according to the CMY data being represented by combination of CMY colorants, wherein CMY are cyan, magenta and yellow; and
generating CMY print data including the scale values of the white color and the CMY colors.

20. A non-transitory computer-readable storage medium that stores a computer-executable program, the program comprising instructions for:
converting inputted image data into black enabled image data, the black enabled image data indicating scale values of a plurality of colors including a black color to be used in the image, the black enabled image data being represented in a color space configured with colors of CMYK, which are cyan, magenta, yellow, and black; and calculating to obtain scale values of the white colorant to be used to form the image, the scale values of the white colorant being obtained by inverting scale values of the black color obtained in the step of converting the inputted image data into the black enabled data;

converting the inputted image data into CMY data, which indicates the scales values of the plurality of colors in CMY colors, the black color in the image according to the CMY data being represented by combination of CMY colorants, wherein CMY are cyan, magenta and yellow; and generating CMY print data including the scale values of the white color and the CMY colors.

21. A print data generating apparatus to generate print data, which is to be used in a printing apparatus to form an image in a plurality of colorants, based on originally inputted image data representing the image, comprising:

a black enabled image data converter unit configured to convert the inputted image data into black enabled image data, the black enabled image data indicating scale values of a plurality of colors including a black color to be used in the image, the black enabled image data being represented in a color space configured with colors of CMYK, which are cyan, magenta, yellow, and black;

a white scale value calculator unit configured to obtain scale values of a white color to be used in the image to be formed, the white scale value calculator unit calculating the scale values of the white color by inverting the scale values of the black color obtained by the black enabled image data converter unit;

a CMYK data converter unit configured to convert the inputted image data into CMYK data, the CMYK data indicating the scales values of the plurality of colors in CMYK colors; and a CMYKW print data generator unit configured to generate CMYKW print data including the scale values of the white color obtained by the white scale value calculator unit and the scale values of the CMYK colors obtained by the CMYK data converter unit, wherein CMYKW are cyan, magenta, yellow, black and white.

22. A print data generating apparatus to generate print data, which is to be used in a printing apparatus to form an image in a plurality of colorants, based on originally inputted image data representing the image, comprising:

a black enabled image data converter unit configured to convert the inputted image data into black enabled image data, the black enabled image data indicating scale values of a plurality of colors including a black color to be used in the image, the black enabled image data being represented in a color space configured with colors of CMYK, which are cyan, magenta, yellow, and black;

a white scale value calculator unit configured to obtain scale values of a white color to be used in the image to be formed, the white scale value calculator unit calculating the scale values of the white color by inverting the scale values of the black color obtained by the black enabled image data converter unit;

a black base usable print data generator unit configured to generate black base usable print data, the black base usable print data indicating the scale values of the colors in the image in the CMYK colors and the white color, the black base usable print data including the scale values of the white color obtained by the white scale value calculator unit and the scale values of the black color being zero;

a CMY data converter unit configured to convert the inputted image data into CMY data, the CYM data indicating the scales values of the plurality of colors in CMY colors, wherein CMY are cyan, magenta and yellow:

a CMY print data generator unit configured to generate CMY print data including the scale values of the white color being zero and the CMY colors, the black color in the image according to the CMY data being represented by combination of CMY colorants; and a first selecting unit configured to select one of the black base usable print data generator unit and the CMY print data generator unit to be used to generate the print data.

23. A print data generating apparatus to generate print data, which is to be used in a printing apparatus to form an image in a plurality of colorants, based on originally inputted image data representing the image, comprising:

a black enabled image data converter unit configured to convert the inputted image data into black enabled image data, the black enabled image data indicating scale values of a plurality of colors including a black color to be used in the image, the black enabled image data being represented in a color space configured with colors of CMYK, which are cyan, magenta, yellow, and black;

a white scale value calculator unit configured to obtain scale values of a white color to be used in the image to be formed, the white scale value calculator unit calculating the scale values of the white color by inverting the scale values of the black color obtained by the black enabled image data converter unit;

a black base usable print data generator unit configured to generate black base usable print data, the black base usable print data indicating the scale values of the colors in the image in the CMYK colors and the white color, the black base usable print data including the scale values of the white color obtained by the white scale value calculator unit and the scale values of the black color being zero;

a CMYK data converter unit configured to convert the inputted image data into CMYK data, the CMYK data indicating the scales values of the plurality of colors in CMYK colors;

a CMYKW print data generator configured to generate CMYKW print data including the scale values of the white color obtained by the white scale value calculator unit and the scale values of the CMYK colors obtained by the CMYK data converter unit, wherein CMYKW are cyan, magenta, yellow, black and white; and a second selecting unit configured to select one of the black base usable print data generator unit and the CMYKW print data generator unit to be used to generate the print data.

* * * * *